| (12) | United States Patent | (10) Patent No.: | US 11,502,579 B2 |
|---|---|---|---|
| | Nakamatsu | (45) Date of Patent: | Nov. 15, 2022 |

(54) MOTOR UNIT COMPRISING OIL FLOW PASSAGES

(71) Applicant: NIDEC CORPORATION, Kyoto (JP)

(72) Inventor: Shuhei Nakamatsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 256 days.

(21) Appl. No.: 16/752,694

(22) Filed: Jan. 27, 2020

(65) Prior Publication Data

US 2020/0266687 A1   Aug. 20, 2020

(30) Foreign Application Priority Data

Feb. 15, 2019   (JP) .............................. JP2019-025797
Nov. 8, 2019    (JP) .............................. JP2019-203387

(51) Int. Cl.

| H02K 9/193 | (2006.01) |
|---|---|
| B60K 1/00 | (2006.01) |
| H02K 5/20 | (2006.01) |
| H02K 5/24 | (2006.01) |
| H02K 7/00 | (2006.01) |
| H02K 7/116 | (2006.01) |
| H02K 21/14 | (2006.01) |

(52) U.S. Cl.
CPC .............. *H02K 9/193* (2013.01); *B60K 1/00* (2013.01); *H02K 5/20* (2013.01); *H02K 5/24* (2013.01); *H02K 7/003* (2013.01); *H02K 7/116* (2013.01); *H02K 21/14* (2013.01); *B60K 2001/006* (2013.01)

(58) Field of Classification Search
CPC ............ H02K 9/193; H02K 5/20; H02K 5/24; H02K 7/003; H02K 7/116; H02K 21/14; H02K 21/145; H02K 9/19; H02K 5/161; B60K 1/00; B60K 2001/006; B60K 2001/001
USPC ...................................................... 310/51, 54
See application file for complete search history.

(56) References Cited

U.S. PATENT DOCUMENTS

| 5,973,427 | A | * | 10/1999 | Suzuki | ..................... H02K 9/19 310/52 |
|---|---|---|---|---|---|
| 8,080,909 | B2 | * | 12/2011 | Perkins | .................... H02K 9/19 310/59 |
| 9,847,698 | B2 | | 12/2017 | Yoshinori et al. | |

(Continued)

FOREIGN PATENT DOCUMENTS

| DE | 102012022452 A1 | 5/2014 |
|---|---|---|
| WO | 2018030343 A1 | 2/2018 |

*Primary Examiner* — John K Kim

(74) *Attorney, Agent, or Firm* — Hauptman Ham, LLP

(57) ABSTRACT

A motor unit includes a motor including a rotor, a stator radially outside of the rotor; a housing for housing the motor; an oil passage for circulating the oil in the housing space; and a gear portion connected to a shaft of the rotor. The housing includes a motor housing portion defining a motor chamber in an interior, a gear housing portion defining a gear chamber in an interior, and a partition dividing the gear chamber and the motor chamber. The oil passage includes a flow passage arranged in an interior of the housing, and an oil feeding structure on an upper side of the motor to feed the oil to at least one of a stator core or coil ends. The flow passage includes a portion extending along an axial direction to feed the oil to the oil feeding structure. The partition includes the portion of the flow passage.

5 Claims, 11 Drawing Sheets

(56) References Cited

U.S. PATENT DOCUMENTS

| | | | |
|---|---|---|---|
| 2010/0295391 A1* | 11/2010 | Perkins | H02K 9/19 |
| | | | 903/906 |
| 2016/0099633 A1 | 4/2016 | Yoshinori et al. | |
| 2016/0164377 A1 | 6/2016 | Gauthier et al. | |
| 2016/0254730 A1* | 9/2016 | Lassila | H02K 9/19 |
| | | | 310/54 |
| 2019/0113135 A1* | 4/2019 | Miyamoto | F16H 57/0476 |
| 2020/0266687 A1* | 8/2020 | Nakamatsu | H02K 5/24 |

\* cited by examiner

MOTOR UNIT COMPRISING OIL FLOW PASSAGES

CROSS-REFERENCE TO RELATED APPLICATIONS

The present invention claims priority under 35 U.S.C. § 119 to Japanese Application No. 2019-025797 filed on Feb. 15, 2019 and Japanese Application No. 2019-203387 filed on Nov. 8, 2019, the entire contents of which are incorporated herein by reference.

FIELD OF THE INVENTION

The present invention relates to a motor unit.

BACKGROUND

Motor units including a cooling mechanism have been known since motors generate heat when in operation. A known motor unit includes a structure to allow a coolant to be fed to a motor through a coolant inflow port located radially outside of a stator core to cool the motor.

Coils generally have a pair of coil ends that project to opposite axial sides of a stator core. However, in the aforementioned known motor unit, a flow of the coolant depends on the stator core, and therefore, a sufficient amount of an oil may not be fed to the pair of coil ends. Thus, the coils may not be sufficiently cooled, and hence, the motor may not be sufficiently cooled. In the case where a motor unit is installed in a vehicle, it is conceivable to dispose a reservoir to store an oil on the upper side of a stator so that the oil can drip onto the stator through an outflow port of the reservoir. However, if the oil is fed to the reservoir from radially outside, i.e., from the upper side in the direction of gravity, the oil may not flow to a portion of the reservoir which lies higher in the direction of gravity than a position to which the oil is fed, resulting in unstable feeding of the oil to the stator, when, for example, the vehicle is inclined on a hill or the like, which involves an inclination of a bottom surface of the reservoir.

SUMMARY

A motor unit according to a preferred embodiment of the present invention includes a motor including a rotor arranged to rotate about a motor axis extending in a horizontal direction, and a stator located radially outside of the rotor, the rotor including a shaft; a housing including a housing space to house the motor; an oil housed in the housing; an oil passage arranged to circulate the oil in the housing space to cool the motor; and a gear portion connected to the shaft of the rotor on one side in an axial direction of the motor axis. The stator includes a stator core, and at least one coil wound around the stator core. The at least one coil has a pair of coil ends arranged to project to opposite sides in the axial direction from the stator core. The housing includes a motor housing portion arranged to define in an interior thereof a motor chamber to house the motor, a gear housing portion arranged to define in an interior thereof a gear chamber to house the gear portion, and a partition arranged to divide the gear chamber and the motor chamber. The oil passage includes a flow passage arranged in an interior of the housing, and an oil feeding structure located on an upper side of the motor to feed the oil to at least one of the stator core and the coil ends. The flow passage includes a portion arranged to extend along the axial direction, and arranged to feed the oil to the oil feeding structure. The partition includes the portion of the flow passage arranged to feed the oil to the oil feeding structure.

The above and other elements, features, steps, characteristics and advantages of the present disclosure will become more apparent from the following detailed description of the preferred embodiments with reference to the attached drawings.

DETAILED DESCRIPTION

Figure 1:
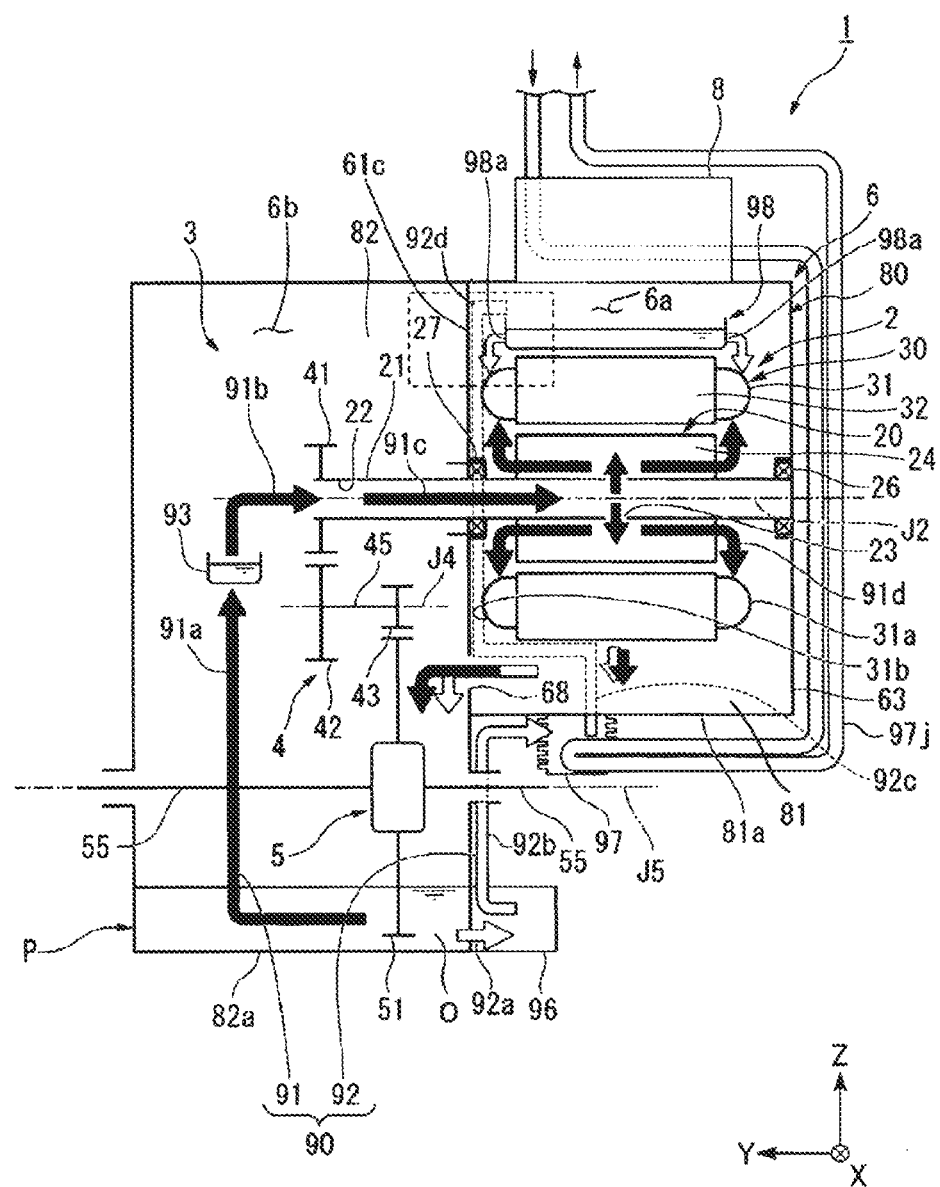
FIG. 1 is a schematic diagram of a motor unit according to a first preferred embodiment.

Hereinafter, a motor unit 1 according to a first preferred embodiment of the present invention will be described with reference to the accompanying drawings. Note that the scope of the present invention is not limited to preferred embodiments described below, but includes any modification thereof within the scope of the technical idea of the present invention.

The following description will be made with the direction of gravity being defined on the basis of positional relationships when the motor unit 1 is installed in a vehicle located on a horizontal road surface. In the accompanying drawings, an xyz coordinate system is shown appropriately as a three-dimensional orthogonal coordinate system. In the xyz coordinate system, a z-axis direction corresponds to a vertical direction (i.e., an up-down direction), and a +z direction points upward (i.e., in a direction opposite to the direction of gravity), while a −z direction points downward (i.e., in the direction of gravity). In addition, an x-axis direction corresponds to a front-rear direction of the vehicle in which the motor unit 1 is installed, and is a direction perpendicular to the z-axis direction. In the present preferred embodiment, a +x side corresponds to a forward side of the vehicle, while a −x side corresponds to a rearward side of the vehicle. A y-axis direction is a direction perpendicular to both the x-axis direction and the z-axis direction, and is a width direction (i.e., a left-right direction) of the vehicle. In the present preferred embodiment, a +y side corresponds to a left side of the vehicle, while a −y side corresponds to a right side of the vehicle. Note that the definition of the forward and rearward sides in the front-rear direction is not limited to the definition of the present preferred embodiment, and that the +x side and the −x side may correspond to the rearward side and the forward side, respectively, of the vehicle. In this case, the +y side corresponds to the right side of the vehicle, while the −y side corresponds to the left side of the vehicle.

In the following description, unless otherwise specified, a direction (i.e., the y-axis direction) parallel to a motor axis J2 of a motor 2 will be simply referred to by the term "axial direction", "axial", or "axially", radial directions centered on the motor axis J2 will be simply referred to by the term "radial direction", "radial", or "radially", and a circumferential direction centered on the motor axis J2, i.e., a circumferential direction about the motor axis J2, will be simply referred to by the term "circumferential direction", "circumferential", or "circumferentially".

In addition, it is assumed herein that the wording "to extend along" a specific direction (or plane) includes not only to extend exactly in the specific direction but also to extend in a direction at an angle of less than 450 to the exact specific direction.

The motor unit 1 according to a preferred embodiment of the present invention will now be described below. The motor unit 1 according to the present preferred embodiment is installed in a vehicle having a motor as a power source, such as, for example, a hybrid electric vehicle (HEV), a plug-in hybrid vehicle (PHV), or an electric vehicle (EV), and is used as the power source thereof.

The motor unit 1 will be described with reference to FIGS. 1 and 2.

The motor unit 1 includes the motor (i.e., a main motor) 2, a gear portion 3 including a reduction gear 4 and a differential 5, a housing 6, an oil O housed in the housing 6, an oil passage 90, and an inverter unit 8.

A housing space 80, in which the motor 2 and the gear portion 3 are housed, is defined in an interior of the housing 6. That is, the housing space 80 is arranged to house the motor 2. The housing 6 is arranged to hold the motor 2 and the gear portion 3 in the housing space 80. The housing space 80 is divided into a motor chamber 81 arranged to house the motor 2, and a gear chamber 82 arranged to house the gear portion 3.

The housing 6 includes a partition 61c. The housing space 80 is divided by the partition 61c into the motor chamber 81 and the gear chamber 82. In addition, the housing 6 includes a closing portion 63 arranged opposite to the partition 61c to surround the motor chamber 81. The closing portion 63 is detachable from the housing 6. In an assembling process, an operator places the motor 2 in the motor chamber 81 with the closing portion 63 removed. The housing 6 according to the present preferred embodiment is produced by, for example, an aluminum die-casting process, but may alternatively be produced by casting, for example, iron. Note that a breather device (i.e., a breather) 7 to regulate an internal pressure of the motor chamber 81 may be arranged on the upper side of the housing 6.

An oil pool P, i.e., a pool of the oil O, is arranged in a lower region in the housing space 80. In the present preferred embodiment, a bottom portion 81a of the motor chamber 81 is located higher than a bottom portion 82a of the gear chamber 82. In addition, a partition opening 68 is defined in the partition 61c, which is arranged to divide the motor chamber 81 and the gear chamber 82. The partition opening 68 is arranged to bring the motor chamber 81 and the gear chamber 82 into communication with each other. The partition opening 68 allows a portion of the oil O which has been gathered in a lower region in the motor chamber 81 to be transferred to the gear chamber 82 therethrough. Therefore, in the present preferred embodiment, the oil pool P is located in a lower region of the gear chamber 82.

The housing 6 includes a plurality of ribs. The housing 6 includes first ribs 64 and second ribs 65. Each first rib 64 is horizontal, i.e., parallel to the motor axis J2, which extends in a horizontal direction, of the motor 2, which will be described below. Each second rib 65 is arranged to extend in the circumferential direction with respect to the motor axis J2. These ribs contribute to preventing the housing 6 from amplifying vibration and sound generated by rotation of the motor 2. Each first rib 64 also serves as a draining wall during manufacture. The draining wall corresponds to a joint of molds when the aluminum die-casting process is performed.

The motor 2 is housed in the motor chamber 81 of the housing 6. The motor 2 includes a rotor 20 arranged to rotate about the motor axis J2 extending in the horizontal direction, a stator 30 located radially outside of the rotor 20, and a pair of bearings 26 and 27 arranged to rotatably support the rotor 20. The motor 2 according to the present preferred embodiment is an inner-rotor motor. In the present preferred embodiment, in an axial direction, a side on which the gear portion 3 lies with respect to the motor 2 is referred to as a first axial side (or the +y side), while a side on which the motor 2 lies with respect to the gear portion 3 is referred to as a second axial side (or the −y side).

The rotor 20 is caused to rotate by an alternating current being supplied from a battery (not shown) to the stator 30 through the inverter unit 8. The rotor 20 includes a shaft 21, a rotor core 24, and a plurality of rotor magnets 25. The rotor 20 (that is, the shaft 21, the rotor core 24, and the rotor magnets 25) is arranged to rotate about the motor axis J2, which extends in the horizontal direction and in the width direction of the vehicle. A torque of the rotor 20 is transferred to the gear portion 3.

The shaft 21 is arranged to extend along the axial direction with the motor axis J2 as a center. The shaft 21 is arranged to rotate about the motor axis J2. The shaft 21 is a hollow shaft including a hollow portion 22 therein, which is a cavity extending in the axial direction. That is, the hollow portion 22 is located inside of the shaft 21, and is arranged to extend in the axial direction. The shaft 21 includes a communicating hole 23. The communicating hole 23 is arranged to extend in a radial direction to bring the hollow portion 22 into communication with a space outside of the shaft 21.

The shaft 21 is arranged to extend over both the motor chamber 81 and the gear chamber 82 of the housing 6. One end portion of the shaft 21, specifically an end portion thereof on the first axial side, is arranged to project into the gear chamber 82. A first gear 41 of the gear portion 3 is fixed to the end portion of the shaft 21 projecting into the gear chamber 82.

The shaft 21 is rotatably supported by the pair of bearings (i.e., a first bearing 26 and a second bearing 27). The first bearing 26 and the second bearing 27 are located in the motor chamber 81. The first bearing 26 and the second bearing 27 are located on opposite axial sides of the rotor core 24 on the shaft 21. The first bearing 26 and the second bearing 27 are held by the housing 6. More specifically, the first bearing 26 is held by the closing portion 63, while the second bearing 27 is held by the partition 61c.

Figure 7:
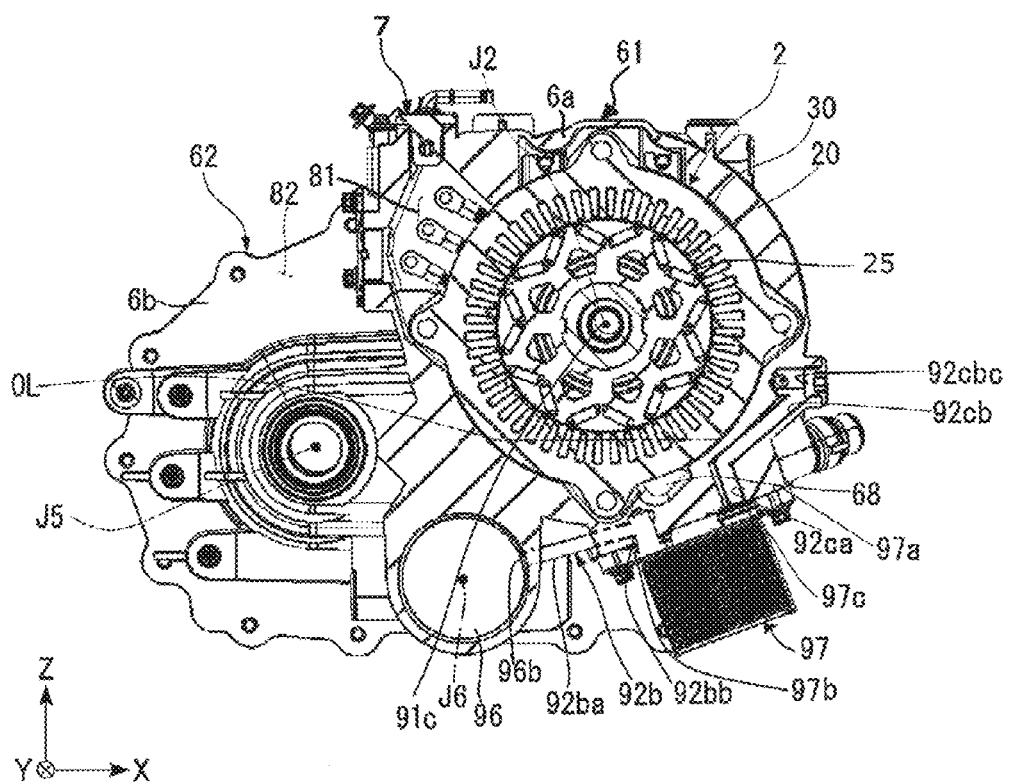
FIG. 7 is a sectional view of the motor unit according to the first preferred embodiment taken along line A-A in FIG. 6.

The rotor core 24 is defined by laminated silicon steel sheets. The rotor core 24 is a columnar body arranged to extend along the axial direction. Referring to FIG. 7, the rotor magnets 25 are fixed to the rotor core 24. The rotor magnets 25 are arranged along the circumferential direction with alternating magnetic poles.

Figure 2:
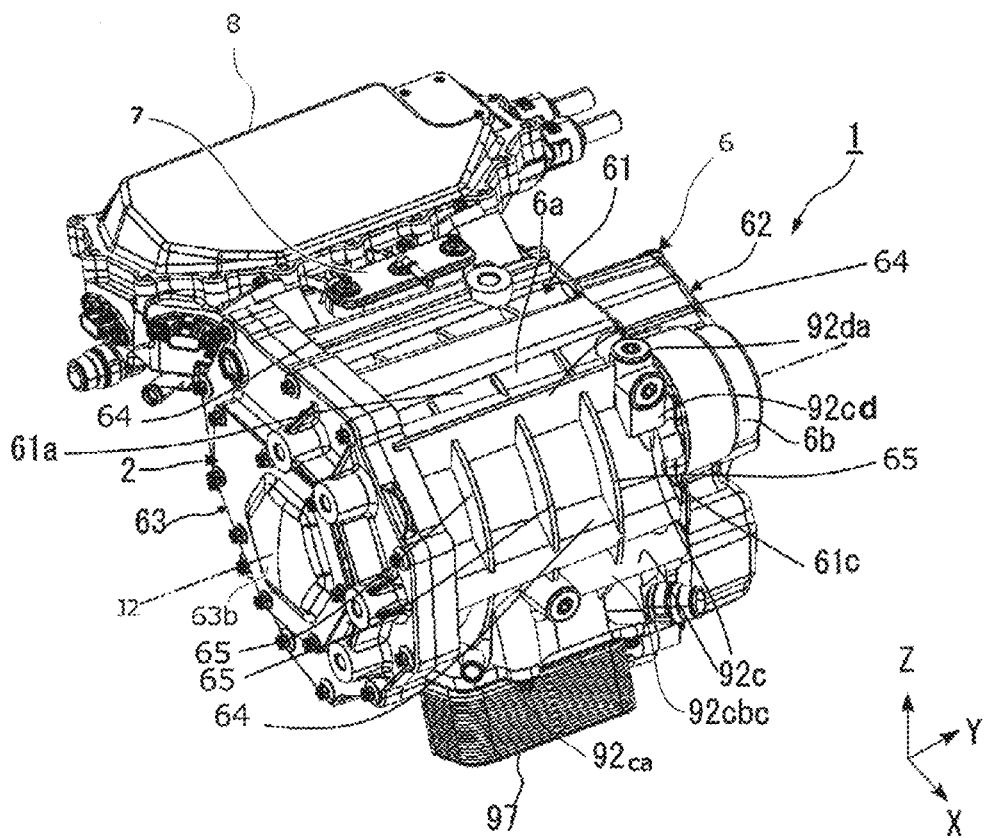
FIG. 2 is a perspective view of the motor unit according to the first preferred embodiment.

Referring to FIG. 1, the stator 30 includes a stator core 32, coils 31, and an insulator (not shown) arranged to intervene between the stator core 32 and the coils 31. The stator 30 is held by the housing 6. The stator core 32 includes a plurality of magnetic pole teeth (not shown) arranged to project radially inward from an inner circumferential surface of a yoke in the shape of a circular ring. A coil wire is wound around each of the magnetic pole teeth. The coil wire wound around each magnetic pole tooth defines the corresponding coil 31. That is, each coil 31 is wound around a portion of the stator core 32 with a portion of the insulator therebetween. Portions of the coil wires extending out of the coils 31 are connected to the inverter unit 8 through busbars (not shown). Note that the insulator may be insulating paper.

The coils 31 have a first coil end 31a and a second coil end 31b. The first coil end 31a is arranged to project to the second axial side of the stator core 32. The second coil end 31b is arranged to project to the first axial side of the stator core 32. That is, the coils 31 have a pair of coil ends 31a and 31b arranged to project to opposite sides of the stator core 32 in the axial direction.

The gear portion 3 is housed in the gear chamber 82 of the housing 6. The gear portion 3 is connected to the shaft 21 on the first axial side, i.e., on one side in the axial direction of the motor axis J2. The gear portion 3 includes the reduction gear 4 and the differential 5. A torque outputted from the motor 2 is transferred to the differential 5 through the reduction gear 4.

The reduction gear 4 is connected to the rotor 20 of the motor 2. The reduction gear 4 has a function of increasing the torque outputted from the motor 2 in accordance with a reduction ratio while reducing the rotation speed of the motor 2. The reduction gear 4 is arranged to transfer the torque outputted from the motor 2 to the differential 5.

The reduction gear 4 includes the first gear (i.e., an intermediate drive gear) 41, a second gear (i.e., an intermediate gear) 42, a third gear (i.e., a final drive gear) 43, and an intermediate shaft 45. The torque outputted from the motor 2 is transferred to a ring gear (i.e., a gear) 51 of the differential 5 through the shaft 21 of the motor 2, the first gear 41, the second gear 42, the intermediate shaft 45, and the third gear 43. The number of gears, the gear ratios of the gears, and so on can be modified in various manners in accordance with a desired reduction ratio. The reduction gear 4 is a speed reducer of a parallel-axis gearing type, in which center axes of gears are arranged in parallel with each other.

The first gear 41 is arranged on an outer circumferential surface of the shaft 21 of the motor 2. The first gear 41 is arranged to rotate about the motor axis J2 together with the shaft 21. The intermediate shaft 45 is arranged to extend along an intermediate axis J4, which is parallel to the motor axis J2. The intermediate shaft 45 is arranged to rotate about the intermediate axis J4. Each of the second gear 42 and the third gear 43 is arranged on an outer circumferential surface of the intermediate shaft 45. The second gear 42 and the third gear 43 are connected to each other through the intermediate shaft 45. Each of the second gear 42 and the third gear 43 is arranged to rotate about the intermediate axis J4. The second gear 42 is arranged to mesh with the first gear 41. The third gear 43 is arranged to mesh with the ring gear 51 of the differential 5.

The differential 5 is connected to the motor 2 through the reduction gear 4. The differential 5 is a device arranged to transfer the torque outputted from the motor 2 to wheels of the vehicle. The differential 5 has a function of transferring the same torque to axles 55 of left and right wheels while absorbing a difference in speed between the left and right wheels when the vehicle is turning. The differential 5 includes the ring gear 51, a gear housing (not shown), a pair of pinion gears (not shown), a pinion shaft (not shown), and a pair of side gears (not shown).

The ring gear 51 is arranged to rotate about a differential axis J5 parallel to the motor axis J2. The torque outputted from the motor 2 is transferred to the ring gear 51 through the reduction gear 4. That is, the ring gear 51 is connected to the motor 2 with other gears intervening therebetween.

Figure 4:
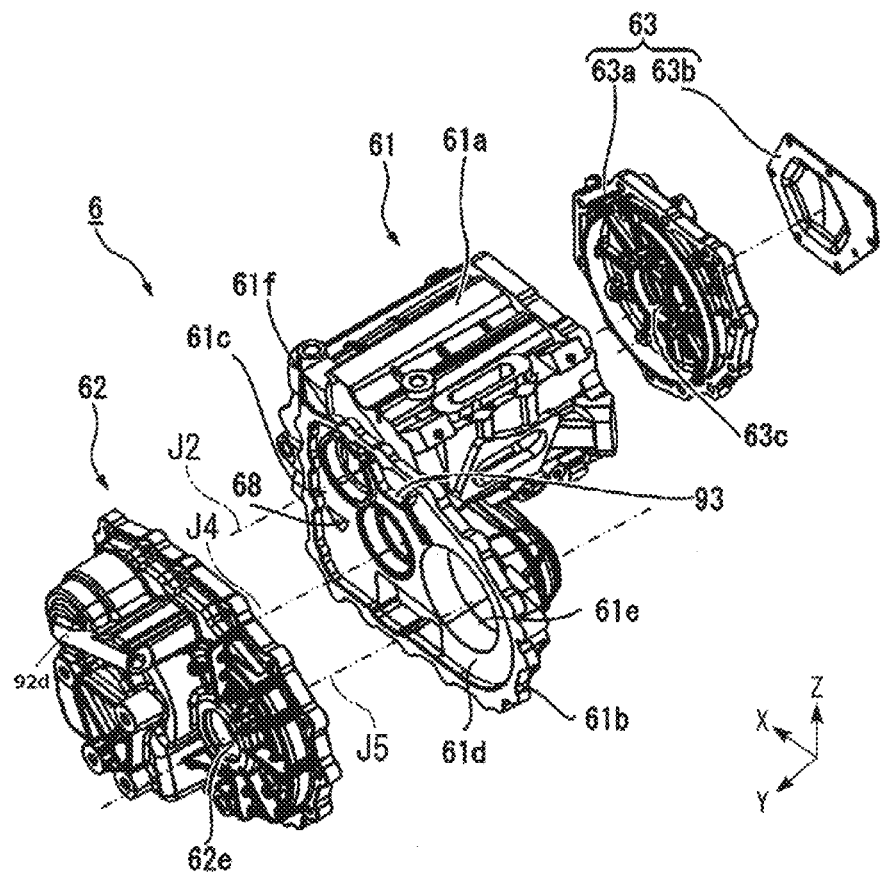
FIG. 4 is an exploded view of a housing according to the first preferred embodiment.

FIG. 4 is an exploded view of the housing 6.

A first housing member 61 includes a tubular peripheral wall portion 61a arranged to surround the motor 2 from radially outside, and a side plate portion 61b located on the first axial side of the peripheral wall portion 61a. A space inside of the peripheral wall portion 61a defines the motor chamber 81. The side plate portion 61b includes the partition 61c and a projecting plate portion 61d. The partition 61c is arranged to cover an opening of the peripheral wall portion 61a on the first axial side. In addition to the aforementioned partition opening 68, an insert hole 61f, through which the shaft 21 of the motor 2 is inserted, is defined in the partition 61c. The side plate portion 61b includes the partition 61c and the projecting plate portion 61d, which is arranged to project radially outward relative to the peripheral wall portion 61a. A first axle insertion hole 61e, through which a drive shaft (not shown) that supports a wheel is arranged to pass, is defined in the projecting plate portion 61d.

The closing portion 63 is fixed to the peripheral wall portion 61a of the first housing member 61. The closing portion 63 is arranged to close an opening of the tubular first housing member 61. The closing portion 63 includes a main closing portion body 63a and a cover member 63b. The main closing portion body 63a includes a window portion 63c arranged to pass therethrough in the axial direction. The cover member 63b is arranged to close the window portion 63c from outside of the housing space 80.

A second housing member 62 is fixed to the side plate portion 61b of the first housing member 61. The second housing member 62 has a recessed shape, opening toward the side plate portion 61b. An opening of the second housing member 62 is covered by the side plate portion 61b. A space between the second housing member 62 and the side plate portion 61b defines the gear chamber 82 to house the gear portion 3. A second axle insertion hole 62e is defined in the second housing member 62. The second axle insertion hole 62e is arranged to coincide with the first axle insertion hole 61e when viewed in the axial direction.

The peripheral wall portion 61a of the first housing member 61 and the closing portion 63 together define the motor chamber 81, surround the motor 2, and house the motor 2. That is, the peripheral wall portion 61a and the closing portion 63 together define a motor housing portion 6a illustrated in FIG. 1.

Similarly, the side plate portion 61b of the first housing member 61 and the second housing member 62 together define the gear chamber 82, surround the gear portion 3, and house the gear portion 3. That is, the side plate portion 61b and the second housing member 62 together define a gear housing portion 6b illustrated in FIG. 1. As described above, the housing 6 includes the motor housing portion 6a, which is arranged to define in an interior thereof the motor chamber 81 to house the motor 2, and the gear housing portion 6b, which is arranged to define in an interior thereof the gear chamber 82 to house the gear portion 3.

Figure 5:
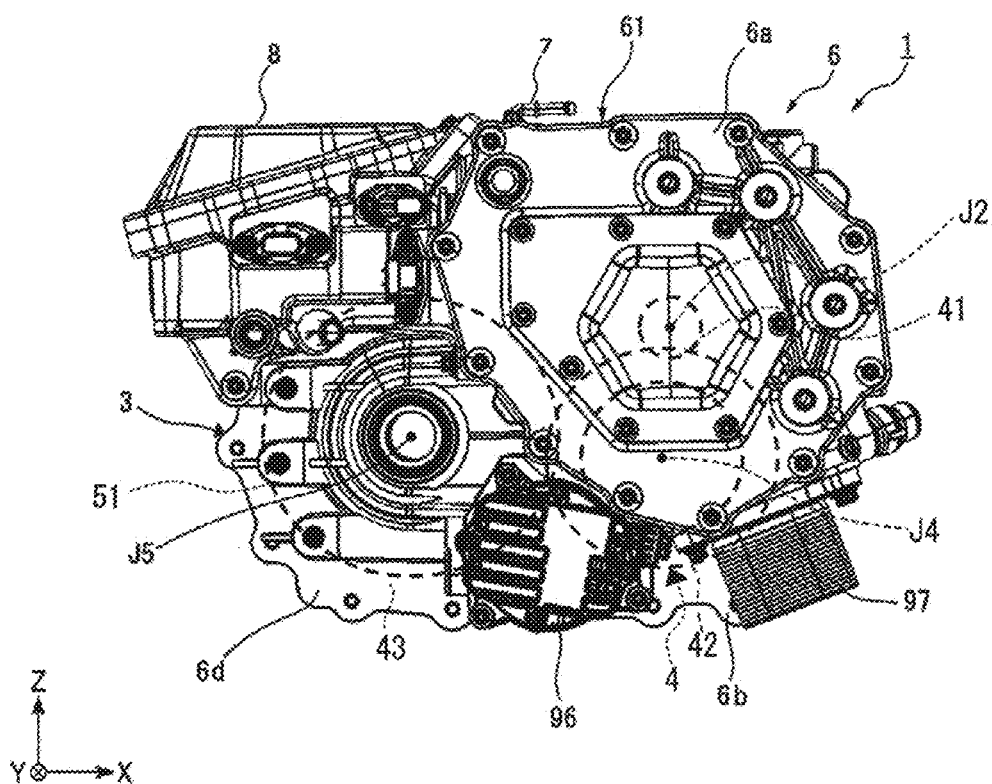
FIG. 5 is a side view of the motor unit according to the first preferred embodiment.
Figure 6:
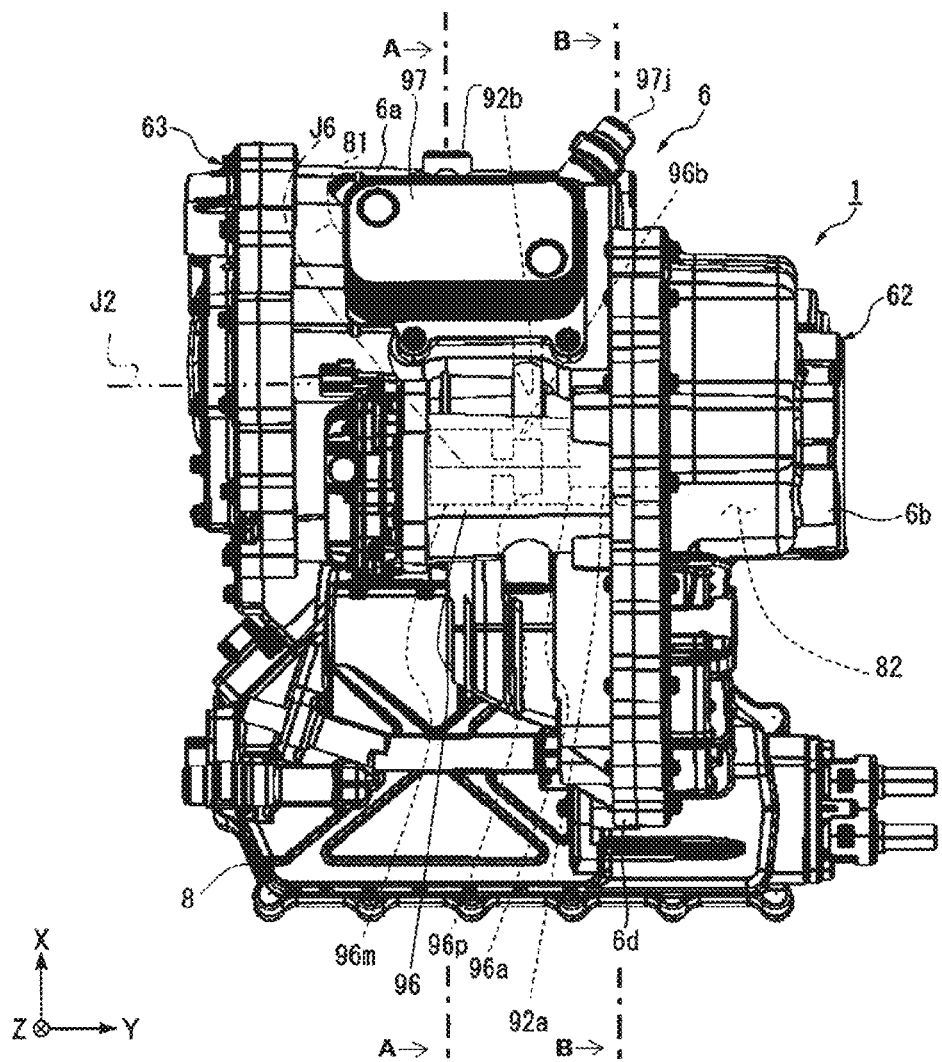
FIG. 6 is a bottom view of the motor unit according to the first preferred embodiment as viewed from below.

FIG. 5 is a side view of the motor unit 1. FIG. 6 is a bottom view of the motor unit 1 as viewed from below.

Referring to FIGS. 5 and 6, the gear housing portion 6b includes a protruding portion 6d arranged to protrude radially outward relative to the motor housing portion 6a when viewed in the axial direction. In the present preferred embodiment, the protruding portion 6d is arranged to protrude downward and toward a rear side of the vehicle relative to the motor housing portion 6a. The protruding portion 6d is arranged to house portions of the gear portion 3. More specifically, a portion of the second gear 42 and a portion of the ring gear 51 are housed inside of the protruding portion 6d.

Referring to FIG. 1, the oil O is arranged to circulate in the oil passage 90 arranged in the housing 6. The oil passage 90 is a channel of the oil O along which the oil O is fed from the oil pool P to the motor 2. The oil passage 90 is arranged to circulate the oil O in the housing space 80 to cool the motor 2.

The oil O is used to lubricate the reduction gear 4, the differential 5, and the bearings. In addition, the oil O is used to cool the motor 2. The oil O is gathered in the lower region in the gear chamber 82, that is, in the oil pool P. An oil equivalent to a lubricating oil (ATF: Automatic Transmission Fluid) for an automatic transmission having a low viscosity is preferably used as the oil O so that the oil O can perform functions of a lubricating oil and a cooling oil.

Referring to FIG. 1, the oil passage 90 is arranged in the housing 6. The oil passage 90 is located in the housing space 80 in the housing 6. The oil passage 90 is arranged to extend over both the motor chamber 81 and the gear chamber 82 of the housing space 80. The oil passage 90 is a channel of the oil O along which the oil O is fed from the oil pool P (i.e., the lower region in the housing space 80), which lies lower than the motor 2, through the motor 2 back to the oil pool P, which lies lower than the motor 2.

Note that the concept of "oil passage" as used herein means a channel along which the oil O circulates in the housing space 80. Therefore, the concept of "oil passage" includes not only a "flow passage", in which an oil steadily flows in one direction, but also a channel (e.g., a reservoir) in which the oil is allowed to temporarily stay, and a channel along which the oil drips.

The oil passage 90 includes a first oil passage 91 arranged to pass through an inside of the motor 2, and a second oil passage (i.e., an oil passage) 92 arranged to pass through an outside of the motor 2. Each of the first oil passage 91 and the second oil passage 92 is arranged to circulate the oil O in the interior of the housing 6. The oil O cools the motor 2 from the inside and the outside through the first oil passage 91 and the second oil passage 92.

First, portions shared by the first oil passage 91 and the second oil passage 92 will be described below. Each of the first oil passage 91 and the second oil passage 92 is a channel along which the oil O is fed from the oil pool P to the motor 2 and back into the oil pool P. In each of the first oil passage 91 and the second oil passage 92, the oil O drips from above the motor 2 to be gathered in the lower region in the motor chamber 81. The oil O gathered in the lower region in the motor chamber 81 travels to the lower region (i.e., the oil pool P) in the gear chamber 82 through the partition opening 68. That is, each of the first oil passage 91 and the second oil passage 92 includes a channel along which the oil O is transferred from the lower region in the motor chamber 81 to the lower region in the gear chamber 82.

Figure 8:
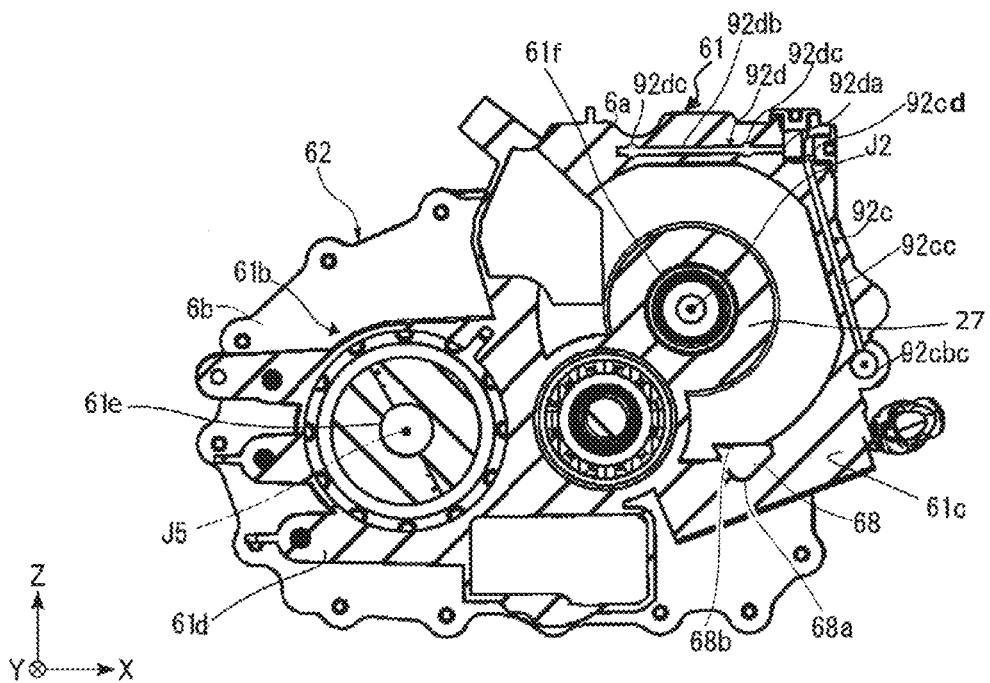
FIG. 8 is a sectional view of the motor unit according to the first preferred embodiment taken along line B-B in FIG. 6.

Each of FIGS. 7 and 8 is a sectional view of the motor unit 1. The inverter unit 8 is not shown in each of FIGS. 7 and 8. A liquid level OL of the oil O gathered in the lower region of the motor chamber 81 is represented by a dot-dashed line.

The partition opening 68 is arranged to pass through the partition 61c in the axial direction to bring the motor chamber 81 into communication with the gear chamber 82. The partition opening 68 is arranged to increase in a horizontal width with increasing height when viewed in the axial direction. A lower end 68a of the partition opening 68 is located at a vertical level close to that of a lower end of the stator 30. An upper end 68b of the partition opening 68 is located at a vertical level slightly higher than that of a lower end of the rotor 20. The upper end 68b of the partition opening 68 has a horizontal width greater than that of the lower end 68a.

Driving of the motor 2 increases the amount of the oil O fed to the motor 2 through the oil passage 90 (i.e., the first oil passage 91 and the second oil passage 92) per unit time. As a result, the liquid level OL of the oil O gathered in the lower region of the motor chamber 81 rises. As mentioned above, the partition opening 68 is arranged to increase in the horizontal width with increasing height when viewed in the axial direction. Accordingly, as the liquid level OL of the oil O in the motor chamber 81 rises, the amount of the oil O which travels from the motor chamber 81 to the gear chamber 82 through the partition opening 68 increases. This contributes to preventing an excessive rise in the liquid level OL of the oil O in the motor chamber 81. That is, a reduction in the likelihood that the rotor 20 in the motor chamber 81 will soak in the oil O or excessively scrape up the oil O can be achieved. Accordingly, a reduction in the likelihood that rotation efficiency of the motor 2 will be reduced by flow resistance of the oil O can be achieved.

Referring to FIG. 1, the oil O is scraped up by the differential 5 from the oil pool P, and is led into an interior of the rotor 20 through the first oil passage 91. A centrifugal force caused by rotation of the rotor 20 is applied to the oil O in the interior of the rotor 20. The oil O is thus spread evenly toward the stator 30, which is arranged to surround the rotor 20 from radially outside, to cool the stator 30.

The first oil passage 91 includes a scraping-up channel 91a, a shaft feed channel 91b, an intra-shaft channel 91c, and an intra-rotor channel 91d. In addition, a first reservoir 93 is arranged in the channel of the first oil passage 91. The first reservoir 93 is arranged in the gear chamber 82. The first reservoir 93 has a function of temporarily storing a specified amount of the oil O.

Figure 3:
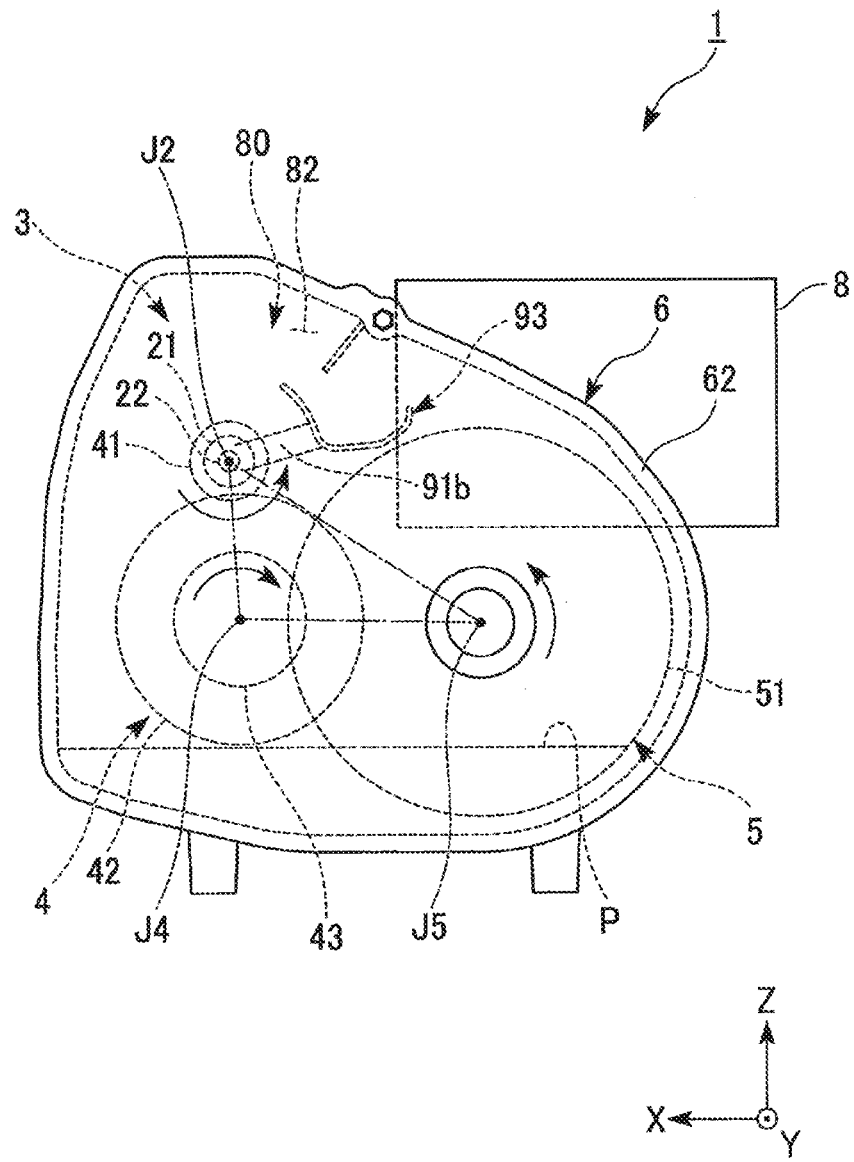
FIG. 3 is a schematic side view of the motor unit according to the first preferred embodiment.

The scraping-up channel 91a is a channel along which the oil O is scraped up from the oil pool P by rotation of the ring gear 51 of the differential 5 to be received by the first reservoir 93. Referring to FIG. 3, the first reservoir 93 is arranged between the intermediate axis J4 and the differential axis J5. Specifically, the first reservoir 93 is located between the intermediate axis J4 and the differential axis J5 in the front-rear direction. The first reservoir 93 is arranged to open upward. The first reservoir 93 receives a portion of the oil O which has been scraped up by the ring gear 51. The first reservoir 93 also receives portions of the oil O which have been scraped up by the second gear 42 and the third gear 43 in addition to the ring gear 51 when, for example, a liquid surface of the oil pool P is at a high level, e.g., immediately after the motor 2 is started.

The shaft feed channel 91*b* is arranged to lead the oil O from the first reservoir 93 into the hollow portion 22 of the shaft 21. Referring to FIG. 1, the intra-shaft channel 91*c* is a channel along which the oil O passes in the hollow portion 22 of the shaft 21. That is, the oil passage 90 includes the intra-shaft channel 91*c* located in the hollow portion 22. The intra-rotor channel 91*d* is a channel along which the oil O passes through the communicating hole 23 of the shaft 21 and an interior of the rotor core 24, and is scattered radially outward to reach the stator 30.

In the intra-shaft channel 91*c*, a centrifugal force is applied to the oil O in the interior of the rotor 20 due to the rotation of the rotor 20. Thus, the oil O is continuously scattered radially outward from the rotor 20. In addition, the scattering of the oil O generates a negative pressure in the channel in the interior of the rotor 20, causing the oil O gathered in the first reservoir 93 to be sucked into the interior of the rotor 20, so that the channel in the interior of the rotor 20 is filled with the oil O.

A portion of the oil O which has reached the stator 30 absorbs heat from the stator 30. Having cooled the stator 30, the oil O drips downward from the stator 30, and is gathered in the lower region in the motor chamber 81. The oil O gathered in the lower region in the motor chamber 81 travels into the gear chamber 82 through the partition opening 68 defined in the partition 61*c*.

The second oil passage (i.e., a flow passage) 92 includes a first oil passage (i.e., a flow passage) 92*a*, a second oil passage (i.e., a flow passage) 92*b*, a third oil passage (i.e., a flow passage) 92*c*, and a fourth oil passage (i.e., a flow passage) 92*d*. That is, the second oil passage 92 includes the first flow passage 92*a*, the second flow passage 92*b*, the third flow passage 92*c*, and the fourth flow passage 92*d*. A pump 96, a cooler 97, and a second reservoir (i.e., an oil feeding structure) 98 are arranged in a channel of the second oil passage 92. That is, the second oil passage 92, that is, the oil passage 90, includes flow passages arranged in the interior of the housing 6, and an oil feeding structure. In the present preferred embodiment, as the flow passages in the interior of the housing 6 (which includes an interior of a wall portion of the housing 6), at least the first flow passage 92*a*, the second flow passage 92*b*, the third flow passage 92*c*, and the fourth flow passage 92*d* are arranged. The oil feeding structure is housed in the interior of the housing 6. The oil feeding structure includes a reservoir arranged to store the oil O, and this reservoir is the second reservoir 98 in the present preferred embodiment. The oil feeding structure is located on the upper side of the motor 2 to feed the oil O to at least one of the stator core 32 and the coil ends 31*a* and 31*b*. The pump 96 is arranged to feed the oil O to the motor 2. The cooler 97 is arranged to cool the oil O passing through the second oil passage 92. In the second oil passage 92, the oil O passes through the first flow passage 92*a*, the pump 96, the second flow passage 92*b*, the cooler 97, the third flow passage 92*c*, the fourth flow passage 92*d*, and the second reservoir 98 in the order named to be fed to the motor 2.

Each of the first flow passage 92*a*, the second flow passage 92*b*, the third flow passage 92*c*, and the fourth flow passage 92*d* is arranged to pass through a wall portion of the housing 6 which surrounds the housing space 80. The first flow passage 92*a* is arranged to join the oil pool P in the lower region in the housing space 80 to the pump 96. The second flow passage 92*b* is arranged to join the pump 96 to the cooler 97. The third flow passage 92*c* is arranged to join the cooler 97 to the fourth flow passage 92*d*. The fourth flow passage 92*d* is arranged to join the third flow passage 92*c* to an upper region in the housing space 80.

In the present preferred embodiment, each of the first flow passage 92*a*, the second flow passage 92*b*, the third flow passage 92*c*, and the fourth flow passage 92*d* is arranged to pass through an interior of the wall portion of the housing 6 which surrounds the housing space 80. This eliminates the need to additionally provide a tube when defining the flow passages, which contributes to a reduced number of parts.

The pump 96 is an electric pump driven by electricity. The pump 96 is arranged to suck the oil O from the oil pool P through the first flow passage 92*a*, and to feed the oil O to the motor 2 through the second flow passage 92*b*, the cooler 97, the third flow passage 92*c*, the fourth flow passage 92*d*, and the second reservoir 98. That is, the pump 96 is arranged to circulate the oil O in the second oil passage 92.

Referring to FIG. 6, the pump 96 includes a pump mechanism portion 96*p*, a pump motor 96*m*, a suction inlet 96*a*, and a discharge outlet 96*b*. In the present preferred embodiment, the pump mechanism portion 96*p* is a trochoidal pump in which external and internal gears (not shown) rotate while meshing with each other. The internal gear of the pump mechanism portion 96*p* is caused to rotate by the pump motor 96*m*. A gap between the internal gear and the external gear of the pump mechanism portion 96*p* is joined to both the suction inlet 96*a* and the discharge outlet 96*b*.

The suction inlet 96*a* of the pump 96 is joined to the first flow passage 92*a*. The discharge outlet 96*b* of the pump 96 is joined to the second flow passage 92*b*. The pump 96 is arranged to suck the oil O from the oil pool P through the first flow passage 92*a*, and to feed the oil O to the motor 2 through the second flow passage 92*b*, the cooler 97, the third flow passage 92*c*, the fourth flow passage 92*d*, and the second reservoir 98.

The pump motor 96*m* is arranged to rotate the internal gear of the pump mechanism portion 96*p*. A rotation axis J6 of the pump motor 96*m* is parallel to the motor axis J2. The pump 96, including the pump motor 96*m*, tends to have a large dimension along the rotation axis J6. According to the present preferred embodiment, a reduction in the radial dimension of the motor unit 1 can be achieved by arranging the rotation axis J6 of the pump motor 96*m* to be parallel to the motor axis J2. In addition, the reduction in the radial dimension of the motor unit 1 makes it easier to arrange the pump 96 to overlap with the protruding portion 6*d* of the housing 6 when viewed in the axial direction. This in turn makes it easier to achieve a reduced size of the motor unit 1 since an increase in the axially projected area of the motor unit 1 can be reduced.

The pump 96 is located on the lower side of the motor chamber 81. In addition, the pump 96 is fixed to a surface of the protruding portion 6*d* which faces toward the motor housing portion 6*a*. The suction inlet 96*a* of the pump 96 is arranged opposite to the protruding portion 6*d*. The first flow passage 92*a*, which is joined to the suction inlet 96*a* of the pump 96, is arranged to pass in a straight line in the axial direction through a wall surface of the protruding portion 6*d* to open into the lower region in the gear chamber 82. That is, the first flow passage 92*a*, which is arranged to extend along the axial direction from the lower region (i.e., the oil pool P) in the gear chamber 82 to the pump 96, is arranged in the protruding portion 6*d*.

According to the present preferred embodiment, it is easy to arrange the suction inlet 96*a* close to the oil pool P because the pump 96 is arranged on the lower side of the motor chamber 81. This leads to a reduced length of the first flow passage 92*a*, which joins the oil pool P and the suction inlet 96*a*. In addition, a reduction in the distance between the oil pool P and the suction inlet 96a enables the first flow passage 92a to be a flow passage extending in a straight line. The first flow passage 92a being a short, straight flow passage leads to a reduced pressure loss of a channel leading from the oil pool P to the pump 96, and increased efficiency in the circulation of the oil O.

Referring to FIG. 1, the second flow passage 92b and the third flow passage 92c are connected to the cooler 97. The second flow passage 92b and the third flow passage 92c are joined to each other through an internal flow passage of the cooler 97. A coolant pipe 97j, in which a coolant cooled by a radiator (not shown) is caused to pass, is connected to the cooler 97. A portion of the oil O which passes through an interior of the cooler 97 is cooled through heat exchange with the coolant passing through the coolant pipe 97j. The inverter unit 8 is arranged in a channel of the coolant pipe 97j. The coolant, which passes through the coolant pipe 97j, cools the inverter unit 8.

Referring to FIG. 7, the cooler 97 is located on the lower side of the motor chamber 81 in the vertical direction. The cooler 97 is fixed to an outer peripheral surface, which faces radially outward, of the motor housing portion 6a. The cooler 97 includes a contact surface 97a arranged to be in contact with the outer peripheral surface of the motor housing portion 6a. The contact surface 97a is located on the lower side of the motor chamber 81 in the vertical direction. Referring to FIG. 1, the oil O fed to the motor 2 is temporarily gathered in the lower region in the motor chamber 81, and thereafter travels to the lower region in the gear chamber 82 through the partition opening 68. That is, each of the first oil passage 91 and the second oil passage 92 passes through the lower region of the motor chamber 81. According to the present preferred embodiment, the contact surface 97a of the cooler 97, which is in contact with the motor housing portion 6a, is located on the lower side of the motor chamber 81. Thus, each of the first oil passage 91 and the second oil passage 92 includes a channel that passes between the motor 2 and the contact surface 97a in the lower region of the motor chamber 81. Thus, the oil O, passing through the lower region in the motor chamber 81, can be cooled by the contact surface 97a through the wall surface of the motor housing portion 6a. With the oil O gathered in the lower region in the motor chamber 81 being cooled, the stator 30 of the motor 2, a portion of which soaks in the oil O, is cooled from the lower side. Thus, the motor 2 can be cooled effectively. In addition, the partition opening 68 and the contact surface 97a of the cooler 97 are arranged to overlap at least in part with each other when viewed in a radial direction with respect to the motor axis J2. A portion of the oil O which flows from the lower region of the motor chamber 81 into the gear chamber 82 passes through the partition opening 68. According to the present preferred embodiment, the oil O passing through the partition opening 68 can be cooled by the contact surface 97a of the cooler 97.

Referring to FIG. 5, each of the cooler 97 and the pump 96 is arranged to overlap at least in part with the protruding portion 6d of the gear housing portion 6b when viewed in the axial direction. The gear portion 3 is housed in an interior of the protruding portion 6d. The axially projected area of the protruding portion 6d is determined depending on the sizes of the gears of the gear portion 3. According to the present preferred embodiment, arranging each of the cooler 97 and the pump 96 to overlap with the protruding portion 6d when viewed in the axial direction contributes to reducing an increase in the axially projected area of the motor unit 1 due to the cooler 97 and the pump 96. Thus, the increase in the axially projected area of the motor unit 1 can be reduced to achieve a reduced size of the motor unit 1.

According to the present preferred embodiment, each of the cooler 97 and the pump 96 is arranged to overlap at least in part with the second gear 42 of the gear portion 3 when viewed in the axial direction. This allows each of the cooler 97 and the pump 96 to overlap with the protruding portion 6d when viewed in the axial direction even in the case where the projected area of the protruding portion 6d when viewed in the axial direction is minimized by arranging the protruding portion 6d to have a shape matching the external shapes of the gears of the gear portion 3. This in turn contributes to reducing the increase in the axially projected area of the motor unit 1, and achieving a reduced size of the motor unit 1.

According to the present preferred embodiment, both a lower end of the cooler 97 and a lower end of the pump 96 are arranged at substantially the same level as that of a lower end of the protruding portion 6d. That is, each of the cooler 97 and the pump 96 does not protrude below the lower end of the protruding portion 6d. This leads to a reduction in the dimension of the motor unit 1 in the up-down direction. According to the present preferred embodiment, the cooler 97 is arranged to be greater in axial dimension than in radial dimension.

The vertical position of the cooler 97 is arranged to overlap with the vertical position of the differential axis J5. This contributes to preventing the cooler 97 from projecting to the upper side or lower side in the vertical direction, and achieving a reduced vertical dimension of the motor unit 1.

Referring to FIG. 5, each of the cooler 97 and the pump 96 is located on the lower side of the motor chamber 81 in the vertical direction. The motor unit 1 is arranged, for example, under a hood of the vehicle. In the motor unit 1, each of the cooler 97 and the pump 96 forms a protrusion projecting with respect to the housing 6. According to the present preferred embodiment, each of the cooler 97 and the pump 96 is arranged on the lower side of the motor chamber 81 in the vertical direction, and this contributes to reducing the likelihood that, when the vehicle collides against an object in an accident, for example, each of the cooler 97 and the pump 96, which form protrusions, will strike into the object.

According to the present preferred embodiment, each of the pump 96 and the cooler 97 is fixed to an outer peripheral surface of the housing 6. This contributes to achieving a reduction in the size of the motor unit 1 when compared to the case where each of the pump 96 and the cooler 97 is fixed to a structure outside of the housing 6.

Referring to FIG. 7, the second flow passage 92b is arranged to pass through an interior of a wall portion of the motor housing portion 6a. The second flow passage 92b includes a straight portion 92ba and a connection hole portion 92bb. In the second flow passage 92b, the oil O flows through the straight portion 92ba and the connection hole portion 92bb in the order named.

The straight portion 92ba is arranged to extend in a straight line along the circumferential direction with respect to the motor axis J2. An upstream end of the straight portion 92ba is connected to the discharge outlet 96b of the pump 96. Meanwhile, an opposite, downstream end of the straight portion 92ba is arranged to extend up to a position radially inside of the cooler 97, and is connected to the connection hole portion 92bb.

The connection hole portion 92bb is arranged to extend along a radial direction. The connection hole portion 92bb is arranged to open in the outer peripheral surface of the motor housing portion 6a. An opening of the connection hole portion 92bb is connected to an inflow port 97b of the cooler 97.

According to the present preferred embodiment, the second flow passage 92b is arranged to extend along the circumferential direction with respect to the motor axis J2 in the interior of the wall portion of the motor housing portion 6a. In addition, the axial position of the second flow passage 92b is arranged to overlap with the axial position of the stator 30. That is, the second flow passage 92b and the stator 30 are arranged to overlap with each other in the axial position. Thus, the stator 30 can be cooled by the oil O passing through the second flow passage 92b.

Referring to FIGS. 7 and 8, the third flow passage 92c is arranged to pass through the interior of the wall portion of the motor housing portion 6a. The third flow passage 92c includes a first connection hole portion 92ca, a first straight portion 92cb, a second straight portion 92cbc, a third straight portion 92cc, and a second connection hole portion 92cd. In the third flow passage 92c, the oil O flows through the first connection hole portion 92ca, the first straight portion 92cb, the second straight portion 92cbc, the third straight portion 92cc, and the second connection hole portion 92cd in the order named.

The first connection hole portion 92ca is arranged to extend along a radial direction. The first connection hole portion 92ca is arranged to open in the outer peripheral surface of the motor housing portion 6a. An opening of the first connection hole portion 92ca is connected to an outflow port 97c of the cooler 97.

The first straight portion 92cb is arranged to extend in a straight line along the circumferential direction with respect to the motor axis J2. An upstream end of the first straight portion 92cb is connected to the first connection hole portion 92ca. Meanwhile, an opposite, downstream end of the first straight portion 92cb is connected to the second straight portion 92cbc. One end of the first straight portion 92cb is arranged to open in the outer peripheral surface of the motor housing portion 6a, and is covered by a cap member.

The second straight portion 92cbc is arranged to extend in a straight line along the axial direction of the motor axis J2. An upstream end of the second straight portion 92cbc is connected to the first straight portion 92cb. Meanwhile, an opposite, downstream end of the second straight portion 92cbc is connected to the third straight portion 92cc. One end of the second straight portion 92cbc is arranged to open in the outer peripheral surface of the motor housing portion 6a, and is covered by a cap member.

The third straight portion 92cc is arranged to extend in a straight line along the circumferential direction with respect to the motor axis J2. An upstream end of the third straight portion 92cc is connected to the second straight portion 92cbc. Meanwhile, an opposite, downstream end of the third straight portion 92cc is connected to the second connection hole portion 92cd. One end of the third straight portion 92cc is arranged to open in the outer peripheral surface of the motor housing portion 6a, and is covered by a cap member. The third straight portion 92cc is defined in the partition 61c.

An upstream end of the second connection hole portion 92cd is connected to the third straight portion 92cc. Meanwhile, an opposite, downstream end of the second connection hole portion 92cd is connected to the fourth flow passage 92d. One end of the second connection hole portion 92cd is arranged to open into a space above the outer peripheral surface of the motor housing portion 6a, and is covered by a cap member. An end of the second connection hole portion 92cd is arranged to open to the +x side of the motor housing portion 6a, i.e., to the forward side, and is covered by a cap member. The second connection hole portion 92cd is defined in the partition 61c.

According to the present preferred embodiment, the third flow passage 92c is arranged to extend along the circumferential direction and the axial direction of the motor axis J2 in the interior of the wall portion of the motor housing portion 6a. In addition, the axial position of the third flow passage 92c is arranged to overlap with the axial position of the stator 30. Furthermore, the radial position of the third flow passage 92c is arranged to overlap with the radial position of the stator 30. That is, the third flow passage 92c and the stator 30 are arranged to overlap with each other in the axial position. Thus, the stator 30 can be cooled by the oil O passing through the third flow passage 92c. It is to be noted that the oil O flows through the third flow passage 92c immediately after passing through the cooler 97. Therefore, according to the present preferred embodiment, the stator 30 can be efficiently cooled by the oil O flowing through the third flow passage 92c. Note that, in the present preferred embodiment, the cooler 97 is arranged on the downstream side of the pump 96 along the second oil passage 92. However, the cooler 97 may alternatively be arranged on the upstream side of the pump 96 along the second oil passage 92. In this case, the pump 96 is arranged in a flow passage (which corresponds to the third flow passage 92c in the present preferred embodiment) that joins the cooler 97 to an upper region in the housing space 80. Even in this case, when the axial position of the flow passage that joins the cooler 97 to the upper region in the housing space 80 is arranged to overlap with the axial position of the stator 30, the stator 30 can be efficiently cooled by the oil O which has just passed through the cooler 97.

Figure 9:
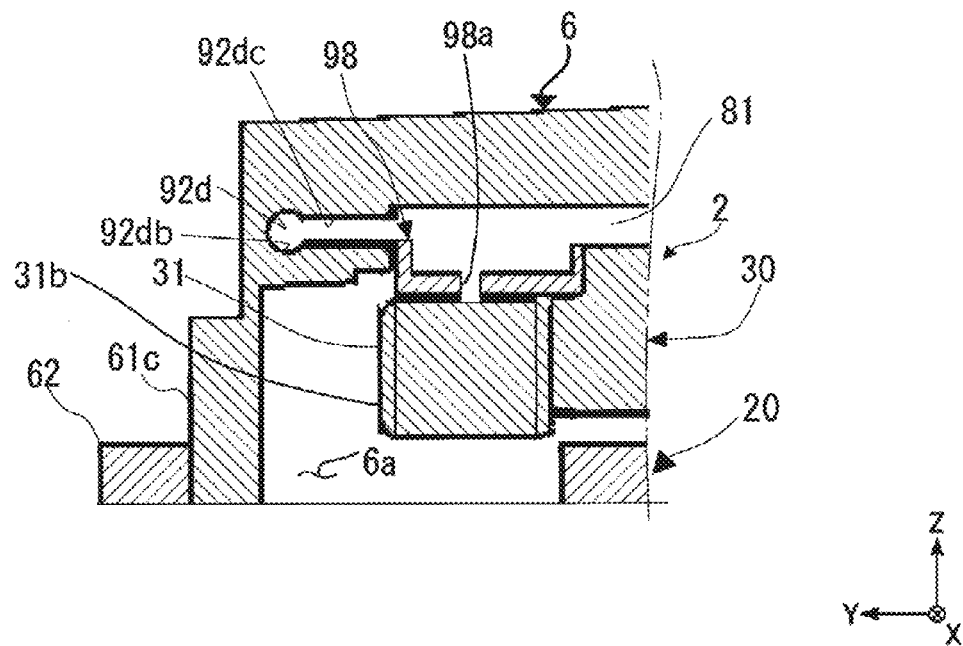
FIG. 9 is an enlarged sectional view of a portion of the motor unit according to the first preferred embodiment.

Referring to FIGS. 8 and 9, the fourth flow passage 92d is arranged to pass through the interior of the wall portion of the motor housing portion 6a. The fourth flow passage 92d includes a first connection hole portion 92da, a first straight portion 92db, and second connection hole portions 92dc. In the fourth flow passage 92d, the oil O flows through the first connection hole portion 92da, the first straight portion 92db, and the second connection hole portions 92dc in the order named. Note that the first connection hole portion 92da may alternatively be referred to as a third connection hole portion 92da. The first straight portion 92db may alternatively be referred to as a fourth straight portion 92db. The second connection hole portions 92dc may alternatively be referred to as fourth connection hole portions 92dc. The fourth flow passage 92d is defined in the partition 61c. That is, the partition 61c includes the fourth flow passage 92d as a portion of a flow passage arranged to feed the oil O to the second reservoir 98.

The first connection hole portion 92da is arranged to open into the second connection hole portion 92cd of the third flow passage 92c. The first connection hole portion 92da is arranged to connect the third flow passage 92c to the fourth flow passage 92d.

The first straight portion 92db is arranged to extend in a straight line along the circumferential direction with respect to the motor axis J2. An upstream end of the first straight portion 92db is connected to the first connection hole portion 92da. In addition, the second connection hole portions 92dc are connected to the first straight portion 92db. That is, a plurality of second connection hole portions 92dc are arranged in the fourth flow passage 92d. In the present preferred embodiment, two of the second connection hole portions 92dc are connected to the first straight portion 92db.

FIG. 9 is a partial, enlarged sectional view illustrating details of an area enclosed by a broken line in FIG. 1. Notice that the x-axis direction and the y-axis direction in FIG. 9 are different from those in each of FIGS. 7 and 8. Specifically, FIG. 9 illustrates a section perpendicular to the x-axis, while each of FIGS. 7 and 8 illustrates a section perpendicular to the y-axis. Here, each second connection hole portion 92*dc* is arranged to extend along the axial direction. The second connection hole portion 92*dc* is arranged to extend up to an inside surface of the wall portion of the motor housing portion 6*a*. One end of the second connection hole portion 92*cd* is arranged to open into the motor chamber 81 above the second reservoir 98. That is, the oil O is fed to the second reservoir 98 from the second connection hole portion 92*dc* extending along the axial direction. The second connection hole portion 92*dc* is a portion of the flow passage. That is, the flow passage includes a portion arranged to extend along the axial direction, and arranged to feed the oil O to the oil feeding structure. In the present preferred embodiment, the oil O flows to the second axial side (i.e., the −y side) in the second connection hole portion 92*dc* to be fed to the second reservoir 98.

According to the present preferred embodiment, each second connection hole portion 92*dc* is arranged to open along the axial direction of the motor axis J2. This enables the oil O to be more securely fed to the second reservoir 98, even when the vehicle (not shown) in which the motor unit 1 is installed is inclined, for example, on a hill, than in the case where the oil O is fed to the second reservoir 98 in a radial direction with respect to the motor axis J2. Specifically, suppose, for example, that the oil O is fed to the second reservoir 98 from the upper side in the direction of gravity. In this case, if a bottom surface of the second reservoir 98 is inclined, the oil O will not flow to a portion of the second reservoir 98 which lies higher in the direction of gravity than a position to which the oil O is fed. In contrast, in the case where the oil O is fed in a horizontal direction, instead of in the direction of gravity, as in the present preferred embodiment, the oil O is fed to the second reservoir 98 with a force causing the oil O to flow in the horizontal direction. Accordingly, the oil O flows with great force along the bottom surface of the second reservoir 98. Thus, even if the bottom surface of the second reservoir 98 is slightly inclined, the oil O flows along the bottom surface and a wall surface of the second reservoir 98. This makes it easier for the oil O to be fed to the entire bottom surface of the second reservoir 98. Thus, the oil O can be securely fed to the motor 2 with a limited influence of the inclination on a hill, for example. In addition, in the present preferred embodiment, a direction in which the oil O flows in each second connection hole portion (i.e., a portion of the flow passage) 92*dc* is the same as a direction in which the oil O flows in the intra-shaft channel 91*c*. Specifically, the oil O flows to the second axial side (i.e., the −y side) in the second connection hole portion 92*dc*, and the oil O flows to the second axial side in the intra-shaft channel 91*c*. This contributes to reducing both the length of an oil passage along which the oil O is led from the oil pool P to the second reservoir 98 through the second connection hole portion 92*dc*, and the length of an oil passage along which the oil O is led from the oil pool P to the intra-shaft channel 91*c*. In addition, because no oil passage needs to be defined in the closing portion 63, which is detachable from the first housing member 61, the structure of the housing 6 can be simpler than in the case where an oil passage is defined in the closing portion 63.

Referring to FIG. 8, in the present preferred embodiment, the second connection hole portions 92*dc* are arranged on both the +x side and the −x side of the motor axis J2 in a radial direction with respect to the motor axis J2, specifically in a horizontal direction. That is, the second connection hole portions 92*dc* are arranged on both sides of the motor axis J2 in the front-rear direction, i.e., on both the forward side and the rearward side of the motor axis J2. Thus, even when the vehicle (not shown) in which the motor unit 1 is installed is inclined, for example, on a hill, the oil O can be evenly fed to both the +x side and the −x side of the second reservoir 98, enabling even cooling of the whole motor 2.

Referring to FIGS. 7 and 8, each of the first straight portion 92*cb* and the third straight portion 92*cc* of the third flow passage 92*c* and the first straight portion 92*db* of the fourth flow passage 92*d* extends in a straight line in a different direction along the circumferential direction with respect to the motor axis J2. The second straight portion 92*cbc* of the third flow passage 92*c* extends in a straight line along the axial direction of the motor axis J2. It is generally difficult to define a curved flow passage in a wall portion of a housing made of a metal material. However, straight flow passages can be easily defined in the wall portion of the housing 6 by a cutting process.

Referring to FIG. 6, in the present preferred embodiment, the axial position of the pump 96 and the axial position of the cooler 97 are arranged to overlap with each other. The cooler 97 and the pump 96 are joined to each other through the second flow passage 92*b*. That is, the second flow passage 92*b*, which is arranged to join the pump 96 and the cooler 97 to each other, is arranged in the second oil passage 92. In the present preferred embodiment, arranging the axial positions of the pump 96 and the cooler 97 to overlap with each other enables the second flow passage 92*b* to extend in a straight line in a direction perpendicular to the axial direction. That is, the second flow passage 92*b* can be defined by a short, straight flow passage, which leads to a reduced pressure loss of a channel leading from the pump 96 to the cooler 97, and increased efficiency in the circulation of the oil O.

Referring to FIG. 1, the second reservoir 98 is located in the motor chamber 81 of the housing space 80. The second reservoir 98 is located on the upper side of the motor 2. The second reservoir 98 is arranged to store the oil O fed to the motor chamber 81 through the third flow passage 92*c* and the fourth flow passage 92*d*. The second reservoir 98 includes a plurality of outflow ports 98*a*. Each outflow port 98*a* is arranged to open toward at least one of the stator core 32 and the coil ends 31*a* and 31*b*. That is, the second reservoir 98, i.e., the reservoir, includes the outflow ports 98*a*, each of which is arranged to open toward at least one of the stator core 32 and the coil ends 31*a* and 31*b*. The oil O gathered in the second reservoir 98 is fed to the motor 2 through each outflow port 98*a*. A portion of the oil O which has flowed out through each outflow port 98*a* of the second reservoir 98 flows downward on and along an outer peripheral surface of the motor 2 while absorbing heat from the motor 2. The whole motor 2 can thus be cooled.

The second reservoir 98 is arranged to extend along the axial direction. The outflow ports 98*a* of the second reservoir 98 are arranged at both axial end portions of the second reservoir 98. The outflow ports 98*a* are located on the upper side of the coil ends 31*a* and 31*b*. This allows the oil O to be poured on the coil ends 31*a* and 31*b* located at both axial ends of the stator 30 to directly cool the coils 31.

After cooling the coils 31, the oil O drips downward, and is gathered in the lower region in the motor chamber 81. The oil O gathered in the lower region in the motor chamber 81 travels into the gear chamber 82 through the partition opening 68 defined in the partition 61*c*.

In the present preferred embodiment, the cooler 97, which is arranged to cool the oil O, is arranged in the channel of the second oil passage 92. A portion of the oil O which has passed through the second oil passage 92 and has been cooled by the cooler 97 joins a portion of the oil O which has passed through the first oil passage 91 at the oil pool P. At the oil pool P, portions of the oil O which have passed through the first oil passage 91 and the second oil passage 92 mix with each other, so that heat is exchanged therebetween. Thus, a cooling effect produced by the cooler 97 arranged in the channel of the second oil passage 92 will have an influence on the portion of the oil O which passes through the first oil passage 91.

In the present preferred embodiment, a portion of the second oil passage 92 is defined in the partition 61*c* of the housing 6. That is, the partition 61*c* includes a portion of the flow passage arranged to feed the oil O to the oil feeding structure. The partition 61*c* has a sufficient axial thickness to hold the second bearing 27. Therefore, even when the second oil passage 92, which is arranged to feed the oil O to the second reservoir 98, is defined in the partition 61*c*, an increase in the thickness of the partition 61*c* is not necessary, allowing a reduced size of the motor unit 1. In detail, in the present preferred embodiment, the flow passage includes a first intra-partition flow passage located in the partition 61*c*, and a plurality of second intra-partition flow passages located in the partition 61*c*, and arranged to branch out from the first intra-partition flow passage and extend in the axial direction. The second intra-partition flow passages are arranged on the downstream side of the first intra-partition flow passage. Specifically, the first intra-partition flow passage includes the first straight portion 92*db* of the fourth flow passage 92*d*. The second intra-partition flow passages include the second connection hole portions 92*dc* of the fourth flow passage 92*d*. Each of the second intra-partition flow passages is arranged to feed the oil O to the second reservoir 98, i.e., the oil feeding structure. According to the present preferred embodiment, the branching of the flow passage in the partition 61*c* eliminates the need to additionally provide a tube or the like for branching, which contributes to a reduced number of parts and a simplified structure. In addition, the oil O can be widely and efficiently fed to the second reservoir 98 from the second intra-partition flow passages.

The inverter unit 8 is electrically connected to the motor 2. The inverter unit 8 is arranged to control supply of an electric current to the motor 2. Referring to FIG. 5, the inverter unit 8 is fixed to the housing 6. More specifically, the inverter unit 8 is fixed to the outer peripheral surface, which faces radially outward, of the motor housing portion 6*a*.

The inverter unit 8 is arranged to overlap at least in part with the protruding portion 6*d* of the gear housing portion 6*b* when viewed in the axial direction. According to the present preferred embodiment, arranging the inverter unit 8 to overlap with the protruding portion 6*d* when viewed in the axial direction contributes to reducing an increase in the axially projected area of the motor unit 1 due to the inverter unit 8. Thus, the increase in the axially projected area of the motor unit 1 can be reduced to achieve a reduced size of the motor unit 1.

In the present preferred embodiment, the inverter unit 8 is arranged to overlap at least in part with the ring gear 51 of the gear portion 3 when viewed in the axial direction. This allows the inverter unit 8 to overlap with the protruding portion 6*d* when viewed in the axial direction even in the case where the projected area of the protruding portion 6*d* when viewed in the axial direction is minimized by arranging the protruding portion 6*d* to have a shape matching the external shapes of the gears of the gear portion 3. This in turn contributes to reducing the increase in the axially projected area of the motor unit 1, and achieving a reduced size of the motor unit 1.

In the present preferred embodiment, the inverter unit 8 is arranged on the opposite side of the motor axis J2 with respect to the cooler 97 when viewed in the vertical direction. This makes it possible to reduce the dimension of the motor unit 1 measured along the horizontal direction with an effective use of an area coinciding with the protruding portion 6*d* when viewed in the axial direction, which leads to a reduced size of the motor unit 1.

Referring to FIG. 1, the coolant pipe 97*j*, which is arranged to extend from the radiator (not shown), is connected to the inverter unit 8. Thus, the inverter unit 8 can be efficiently cooled. In addition, the coolant, flowing in the coolant pipe 97*j*, also cools the motor housing portion 6*a*, which is in contact with a casing portion of the inverter unit 8, through the casing portion.

Next, a motor unit 100 according to a second preferred embodiment of the present invention will be described below. Note that, in the following description of the second preferred embodiment, members or portions that have their equivalents in the first preferred embodiment are designated by the same names and the same reference numerals as those of their equivalents in the first preferred embodiment, and descriptions thereof may be omitted. In the description of the present preferred embodiment, one side in the circumferential direction is referred to as a first circumferential side 81, while an opposite side in the circumferential direction is referred to as a second circumferential side 82. In the present preferred embodiment, the first circumferential side 81 corresponds to the forward side (i.e., the +x side) on the upper side of a motor axis J2, while the second circumferential side 82 corresponds to the rearward side (i.e., the −x side) on the upper side of the motor axis J2.

Figure 10:
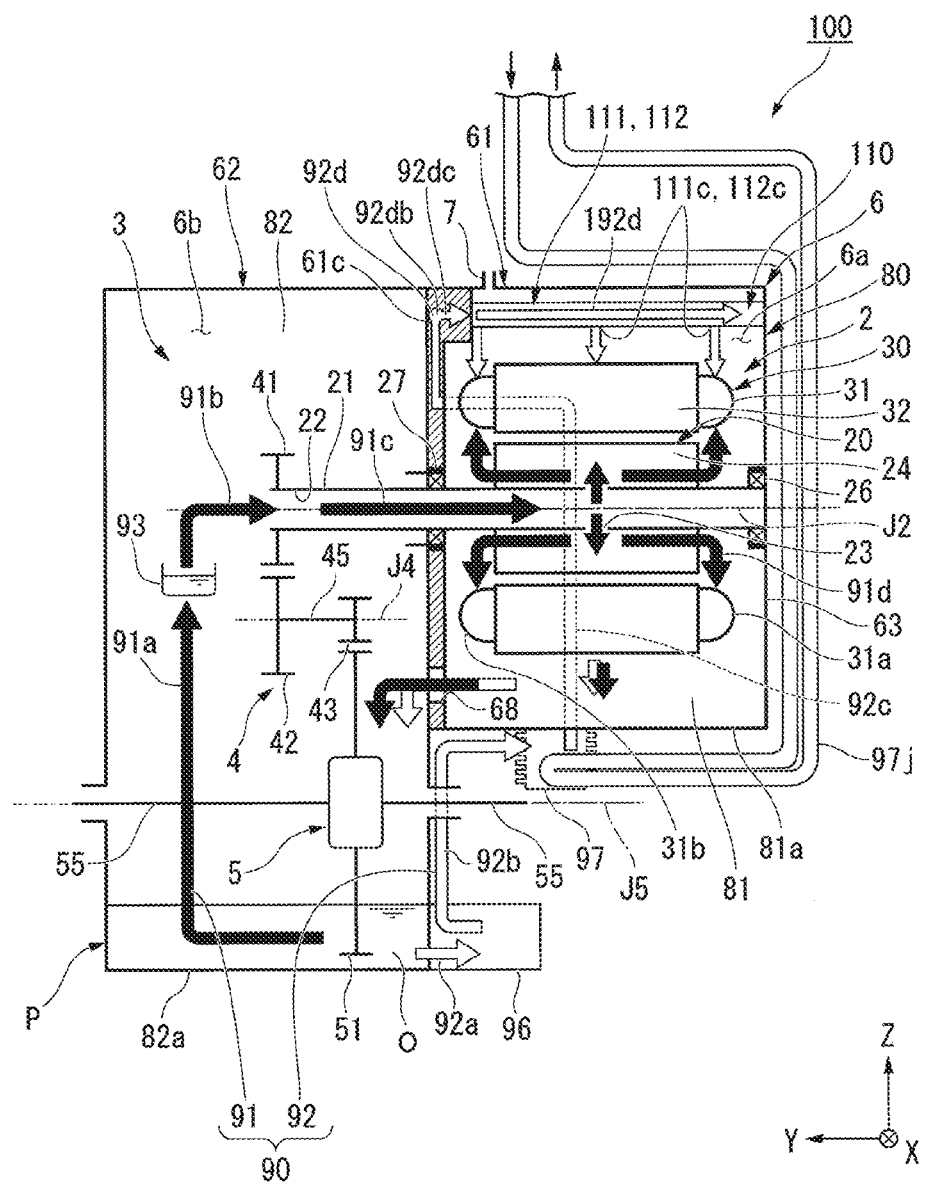
FIG. 10 is a schematic configuration diagram schematically illustrating a motor unit according to a second preferred embodiment.

Referring to FIG. 10, the motor unit 100 includes a motor 2, a gear portion 3 including a reduction gear 4 and a differential 5, a housing 6, a breather 7, an oil O housed in the housing 6, a coolant feed pipe unit 110, and an oil passage 90. In the present preferred embodiment, the motor unit 100 includes no inverter unit. In other words, the motor unit 100 and an inverter unit are provided separately. Note that the motor unit 100 may alternatively include an inverter unit. In other words, the motor unit 100 may alternatively include an inverter unit as an integral portion thereof.

Figure 11:
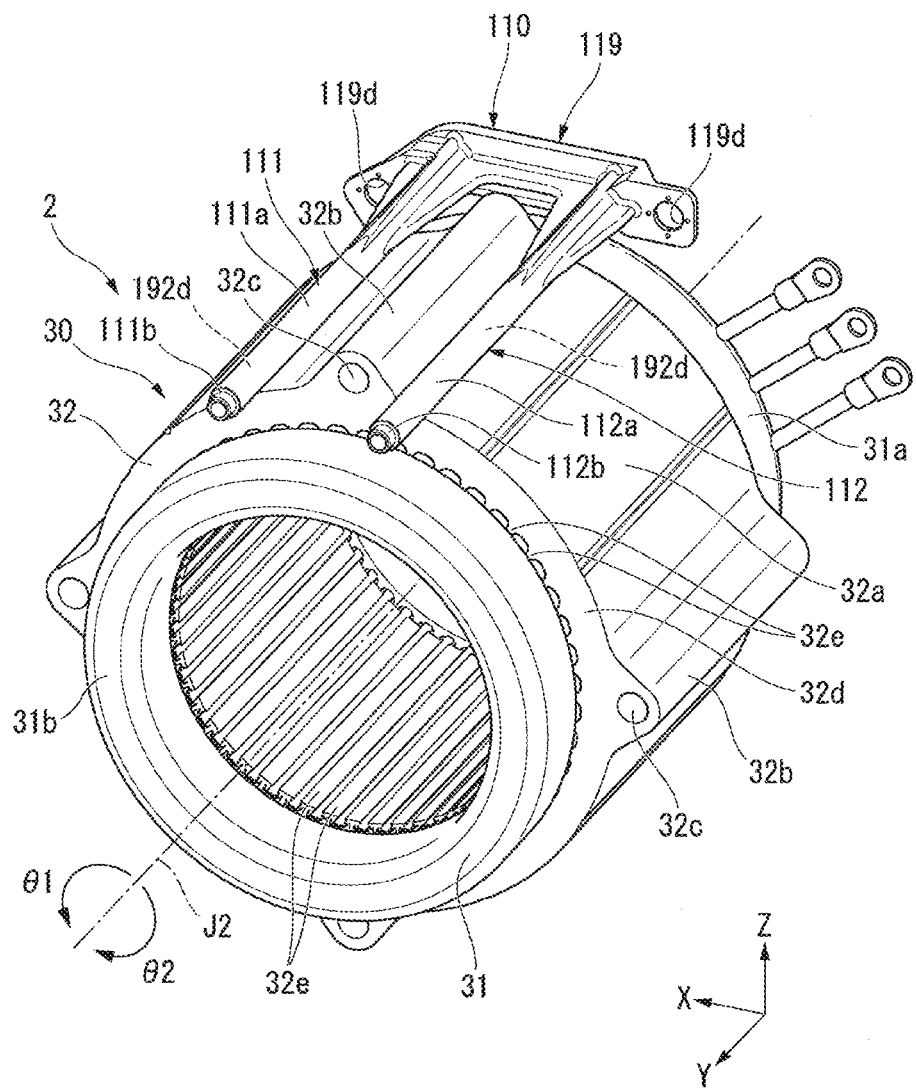
FIG. 11 is a perspective view illustrating a stator and a coolant feed pipe unit according to the second preferred embodiment.

A stator core 32 is fixed to an inner peripheral surface of a motor housing portion 6*a*. Referring to FIG. 11, the stator core 32 includes a stator core body 32*a* and fixing portions 32*b*. That is, a stator 30 includes the fixing portions 32*b*. The stator core body 32*a* includes a cylindrical core back 32*d* arranged to extend in the axial direction, and a plurality of teeth 32*e* arranged to extend radially inward from the core back 32*d*. The teeth 32*e* are arranged apart from one another in the circumferential direction. The teeth 32*e* are arranged at regular intervals in the circumferential direction all the way around the motor axis J2.

Each fixing portion 32*b* is arranged to project radially outward from an outer circumferential surface of the stator core body 32*a*. That is, the fixing portion 32*b* is arranged to project radially outward from an outer circumferential surface of the stator 30. The fixing portion 32*b* is fixed to the motor housing portion 6a. That is, the fixing portion 32b is fixed to the housing 6. The fixing portions 32b, the number of which is more than one, are arranged apart from one another in the circumferential direction. The number of fixing portions 32b is, for example, four. The four fixing portions 32b are arranged at regular intervals in the circumferential direction all the way around the motor axis J2.

One of the fixing portions 32b is arranged to project upward from the stator core body 32a. Another one of the fixing portions 32b is arranged to project downward from the stator core body 32a. Yet another one of the fixing portions 32b is arranged to project to the forward side (i.e., the +x side) from the stator core body 32a. The remaining one of the fixing portions 32b is arranged to project to the rearward side (i.e., the −x side) from the stator core body 32a.

In the following description, the fixing portion 32b that projects upward from the stator core body 32a will be referred to simply as an "upper fixing portion 32b", the fixing portion 32b that projects to the forward side from the stator core body 32a will be referred to simply as a "forward fixing portion 32b", the fixing portion 32b that projects downward from the stator core body 32a will be referred to simply as a "lower fixing portion 32b", and the fixing portion 32b that projects to the rearward side from the stator core body 32a will be referred to simply as a "rearward fixing portion 32b".

Each fixing portion 32b is arranged to extend in the axial direction. In the present preferred embodiment, the fixing portion 32b is arranged to extend from an end portion of the stator core 32 on the left side (i.e., the +y side) to an end portion of the stator core 32 on the right side (i.e., the −y side). That is, the fixing portion 32b is arranged to extend over the entire axial extent of the stator core 32. The fixing portion 32b includes a through hole 32c arranged to pass through the fixing portion 32b in the axial direction. A bolt (not shown), which is arranged to extend in the axial direction, is inserted into the through hole 32c. The bolt is inserted into the through hole 32c from the right side (i.e., the −y side), and is screwed into a female screw hole (not shown) defined in the motor housing portion 6a or a partition 61c. As a result of the bolt being screwed into the female screw hole, the fixing portion 32b is fixed to the motor housing portion 6a or the partition 61c. The outer circumferential surface of the stator core body 32a is arranged to be in contact with the inner peripheral surface of the motor housing portion 6a at one or more positions in the circumferential direction. That is, at least one portion of the outer circumferential surface of the stator core body 32a which lies between circumferentially adjacent ones of the fixing portions 32b is arranged to be in contact with a portion of the inner peripheral surface of the motor housing portion 6a at a circumferential position. In the present preferred embodiment, the outer circumferential surface of the stator core body 32a and the inner peripheral surface of the motor housing portion 6a are arranged to be in contact with each other at a plurality of, e.g., four, positions apart from one another in the circumferential direction. Thus, the inner peripheral surface of the motor housing portion 6a is fitted to the outer circumferential surface of the stator core body 32a. The stator 30 is fixed to the housing 6 by the above-described structure.

Referring to FIG. 11, in the present preferred embodiment, each of coil ends 31a and 31b is in the shape of a circular ring, and is centered on the motor axis J2. Although not shown in the figure, each of the coil ends 31a and 31b may include a binding member or the like which is used to bind coils 31 together, and may include passage lines arranged to join the coils 31 to one another.

Referring to FIG. 10, the housing 6 is arranged to house the oil O as a coolant in an interior thereof. That is, in the present preferred embodiment, the oil O is used as the coolant. The oil O is housed in an interior of the motor housing portion 6a and an interior of a gear housing portion 6b. Note that, when the oil is herein described as being housed in a specific portion, it means that the oil is located in the specific portion at least at one time while the motor is in operation, and the oil may not be located in the specific portion when the motor is at rest. For example, when the oil O is described as being housed in the interior of the motor housing portion 6a in the present preferred embodiment, it means that the oil O is located in the interior of the motor housing portion 6a at least at one time while the motor 2 is in operation, and all of the oil O in the interior of the motor housing portion 6a may have traveled into the gear housing portion 6b through the partition opening 68 when the motor 2 is at rest. Note that a portion of the oil O sent to the interior of the motor housing portion 6a through the oil passage 90 may be left in the interior of the motor housing portion 6a when the motor 2 is at rest.

The breather 7 is arranged to be capable of bringing an interior of the housing 6 into communication with a space outside of the housing 6. For example, when an internal pressure of the housing 6 has exceeded a pressure outside of the housing 6 to such an extent that a difference between the internal pressure and the pressure outside of the housing 6 reaches or exceeds a predetermined value, or when the motor unit 100 has vibrated, the breather 7 brings the interior of the housing 6 into communication with the space outside of the housing 6. In the present preferred embodiment, the breather 7 is arranged at a top wall portion of the housing 6, i.e., at a wall portion of the housing 6 on the upper side. The breather 7 is arranged, for example, at a top wall portion of the motor housing portion 6a.

The coolant feed pipe unit 110 is housed in the interior of the motor housing portion 6a. That is, the coolant feed pipe unit 110 is housed in the interior of the housing 6. The coolant feed pipe unit 110 is arranged between an inner peripheral surface of the housing 6 and the outer circumferential surface of the stator 30. The coolant feed pipe unit 110 is located on the upper side of the stator 30. Specifically, the coolant feed pipe unit 110 is arranged between the top wall portion of the motor housing portion 6a and an upper end portion of the outer circumferential surface of the stator core body 32a. End portions of the coolant feed pipe unit 110 on the left side (i.e., the +y side) are fixed to a wall portion of the motor housing portion 6a or the partition 61c. The end portions of the coolant feed pipe unit 110 on the left side are connected to a fourth flow passage 92d. An end portion of the coolant feed pipe unit 110 on the right side (i.e., the −y side) is fixed to the top wall portion of the motor housing portion 6a or a closing portion 63. That is, the coolant feed pipe unit 110 is fixed to the housing 6.

Referring to FIG. 11, the coolant feed pipe unit 110 includes a first feed pipe (i.e., a feed pipe) 111, a second feed pipe (i.e., a feed pipe) 112, a joining portion 119, a first elastic ring member (not shown), and a second elastic ring member (not shown). That is, the motor unit 100 includes the first feed pipe 111, the second feed pipe 112, the joining portion 119, the first elastic ring member (not shown), and the second elastic ring member (not shown).

Each of the first feed pipe 111 and the second feed pipe 112 is tubular, and is arranged to extend in the axial direction. In the present preferred embodiment, each of the first feed pipe 111 and the second feed pipe 112 is a cylindrical pipe arranged to extend in a straight line along the axial direction. The first feed pipe 111 and the second feed pipe 112 are arranged apart from each other in the front-rear direction. That is, the second feed pipe 112 is arranged apart from the first feed pipe 111. The first feed pipe 111 and the second feed pipe 112 are arranged to be parallel to each other. The first feed pipe 111 and the second feed pipe 112 are located radially outside of the stator 30. In the present preferred embodiment, the first feed pipe 111 and the second feed pipe 112 are arranged at the same radial position. The first feed pipe 111 and the second feed pipe 112 are arranged on the upper side of the stator core body 32a. The first feed pipe 111 and the second feed pipe 112 are arranged at the same position in the up-down direction.

The upper fixing portion 32b is arranged between the first feed pipe 111 and the second feed pipe 112 when viewed in the axial direction. That is, when viewed in the axial direction, an imaginary straight line (not shown) passing through a central axis of the first feed pipe 111 and a central axis of the second feed pipe 112 crosses the upper fixing portion 32b. The first feed pipe 111, the second feed pipe 112, and the upper fixing portion 32b are arranged to overlap with one another when viewed in the front-rear direction. The first feed pipe 111 and the second feed pipe 112 are arranged on opposite sides of the upper fixing portion 32b in the front-rear direction. The first feed pipe 111 is located on the forward side (i.e., the +x side) of the upper fixing portion 32b, while the second feed pipe 112 is located on the rearward side (i.e., the −x side) of the upper fixing portion 32b. In addition, the first feed pipe 111 is located on the first circumferential side θ1 of the upper fixing portion 32b, while the second feed pipe 112 is located on the second circumferential side θ2 of the upper fixing portion 32b.

The upper fixing portion 32b is located between the first feed pipe 111 and the second feed pipe 112 when viewed in a radial direction, specifically, when viewed from the upper side. That is, one of the fixing portions 32b is arranged between the first feed pipe 111 and the second feed pipe 112 when viewed in the radial direction. The first feed pipe 111 is arranged to extend along a direction in which the fixing portion 32b extends. The second feed pipe 112 is arranged to extend along the direction in which the fixing portion 32b extends. According to the present preferred embodiment, through the coolant injected from the first feed pipe 111 and the coolant injected from the second feed pipe 112, the stator 30 can be cooled on both sides of the upper fixing portion 32b over a wide range in the direction in which the fixing portion 32b extends, i.e., in the axial direction.

Referring to FIGS. 10 and 11, the first feed pipe 111 includes a first feed pipe body portion 111a, a decreased diameter portion 111b connected to an end portion of the first feed pipe body portion 111a on the left side (i.e., the +y side), and first injection holes (i.e., injection holes) 111c arranged to pass through a circumferential wall of the first feed pipe body portion 111a. That is, the first feed pipe 111 includes the first injection holes 111c arranged to pass through a circumferential wall of the first feed pipe 111ii. Each first injection hole 111c is arranged to open toward at least one of the stator core 32 and the coil ends 31a and 31b.

The first feed pipe body portion 111a is cylindrical, and is arranged to extend in the axial direction. The decreased diameter portion 111b is cylindrical, and is arranged to extend in the axial direction. The decreased diameter portion 111b is arranged to have an outside diameter smaller than the outside diameter of the first feed pipe body portion 111a. The first feed pipe 111 is fitted to the wall portion of the motor housing portion 6a or the partition 61c with the decreased diameter portion 111b being inserted into a hole portion (not shown) defined in the wall portion of the motor housing portion 6a or the partition 61c from the right side (i.e., the −y side). The decreased diameter portion 111b is arranged to open to the left side (i.e., the +y side). The decreased diameter portion 111b is in communication with the fourth flow passage 92d. Thus, an interior of the first feed pipe 111, i.e., an intra-feed pipe flow passage 192d, which will be described below, is joined to the fourth flow passage 92d.

Each first injection hole 111c is arranged to extend in a pipe radial direction perpendicular to the central axis of the first feed pipe 111 to bring the interior of the first feed pipe 111 into communication with a space outside of the first feed pipe 111. The first injection hole 111c is, for example, in the shape of a circular hole. The first injection hole 111c is located between the inner peripheral surface of the housing 6 and the outer circumferential surface of the stator 30. The first injection hole 111c is arranged to inject the oil O, i.e., the coolant, into a space between the inner peripheral surface of the housing 6 and the outer circumferential surface of the stator 30. The first injection hole 111c is arranged to inject the coolant at least onto the outer circumferential surface of the stator 30. That is, the first feed pipe 111 is arranged to inject the coolant at least onto the outer circumferential surface of the stator 30. The first feed pipe 111 is arranged to feed the coolant to at least an upper end portion of the outer circumferential surface of the stator 30.

The number of first injection holes 111c is more than one. The first injection holes 111c are arranged apart from one another in the axial direction (i.e., the y-axis direction). According to the present preferred embodiment, the oil O is injected from the first injection holes 111c arranged in the axial direction to cool the stator 30 over a wide range in the axial direction. In addition, the first injection holes 111c are arranged apart from one another in the circumferential direction as well. According to the present preferred embodiment, the oil O is injected from the first injection holes 111c arranged in the circumferential direction to cool the stator 30 over a wide range in the circumferential direction as well.

The second feed pipe 112 includes a second feed pipe body portion 112a, a decreased diameter portion 112b connected to an end portion of the second feed pipe body portion 112a on the left side (i.e., the +y side), and second injection holes (i.e., injection holes) 112c arranged to pass through a circumferential wall of the second feed pipe body portion 112a. That is, the second feed pipe 112 includes the second injection holes 112c arranged to pass through a circumferential wall of the second feed pipe 112. Each second injection hole 112c is arranged to open toward at least one of the stator core 32 and the coil ends 31a and 31b.

The second feed pipe body portion 112a is cylindrical, and is arranged to extend in the axial direction. The decreased diameter portion 112b is cylindrical, and is arranged to extend in the axial direction. The decreased diameter portion 112b is arranged to have an outside diameter smaller than the outside diameter of the second feed pipe body portion 112a. The second feed pipe 112 is fitted to the wall portion of the motor housing portion 6a or the partition 61c with the decreased diameter portion 112b being inserted into a hole portion (not shown) defined in the wall portion of the motor housing portion 6a or the partition 61c from the right side (i.e., the −y side). The decreased diameter portion 112b is arranged to open to the left side (i.e., the +y side). The decreased diameter portion 112b is in communication with the fourth flow passage 92d. Thus, an interior of the second feed pipe 112, i.e., an intra-feed pipe flow passage 192d, which will be described below, is joined to the fourth flow passage 92d.

Each second injection hole 112c is arranged to extend in a pipe radial direction perpendicular to the central axis of the second feed pipe 112 to bring the interior of the second feed pipe 112 into communication with a space outside of the second feed pipe 112. The second injection hole 112c is, for example, in the shape of a circular hole. The second injection hole 112c is located between the inner peripheral surface of the housing 6 and the outer circumferential surface of the stator 30. The second injection hole 112c is arranged to inject the oil O, i.e., the coolant, into the space between the inner peripheral surface of the housing 6 and the outer circumferential surface of the stator 30. The second injection hole 112c is arranged to inject the coolant at least onto the outer circumferential surface of the stator 30. That is, the second feed pipe 112 is arranged to inject the coolant at least onto the outer circumferential surface of the stator 30. The second feed pipe 112 is arranged to feed the coolant to at least the upper end portion of the outer circumferential surface of the stator 30.

The number of second injection holes 112c is more than one. The second injection holes 112c are arranged apart from one another in the axial direction (i.e., the y-axis direction). According to the present preferred embodiment, the oil O is injected from the second injection holes 112c arranged in the axial direction to cool the stator 30 over a wide range in the axial direction. In addition, the second injection holes 112c are arranged apart from one another in the circumferential direction as well. According to the present preferred embodiment, the oil O is injected from the second injection holes 112c arranged in the circumferential direction to cool the stator 30 over a wide range in the circumferential direction as well.

The joining portion 119 is arranged to join the first feed pipe 111 and the second feed pipe 112 to each other. According to the present preferred embodiment, with the first feed pipe 111 and the second feed pipe 112 being joined to each other by the joining portion 119, sufficient accuracy in relative positions of the first feed pipe 111 and the second feed pipe 112 can be ensured, making it easier to fit the first feed pipe 111, the second feed pipe 112, and the joining portion 119 in the housing 6. The joining portion 119 is connected to an end portion of the first feed pipe 111 and an end portion of the second feed pipe 112. The joining portion 119 is fixed to the top wall portion of the motor housing portion 6a. According to the present preferred embodiment, it is easy to arrange the joining portion 119 and the fixing portions 32b to have no overlap therebetween when viewed in the radial direction because the joining portion 119 joins the end portion of the first feed pipe 111 and the end portion of the second feed pipe 112 to each other. In addition, both end portions of the first feed pipe 111 are supported by the joining portion 119 and the housing 6 in a double-supported fashion, while both end portions of the second feed pipe 112 are supported by the joining portion 119 and the housing 6 in a double-supported fashion. Thus, the first feed pipe 111 and the second feed pipe 112 are fitted to the housing 6 in stable postures. In addition, the coolant injected from each of the first feed pipe 111 and the second feed pipe 112 is not easily interfered with by the joining portion 119. Thus, the coolant can be injected over a wide range from each of the first feed pipe 111 and the second feed pipe 112, resulting in increased efficiency in cooling the stator 30. Furthermore, the coolant injected from each of the first feed pipe 111 and the second feed pipe 112 can be fed not only to the outer circumferential surface of the stator 30 but also to, for example, a bearing 26 on the closing portion 63 and so on.

The joining portion 119 is connected to, of both axial end portions of the first feed pipe 111, the end portion different from the end portion at which the decreased diameter portion 111b is located, i.e., the end portion on the right side (i.e., the −y side), to close the end portion of the first feed pipe 111 on the right side. The joining portion 119 is connected to, of both axial end portions of the second feed pipe 112, the end portion different from the end portion at which the decreased diameter portion 112b is located, i.e., the end portion on the right side, to close the end portion of the second feed pipe 112 on the right side. In other words, the joining portion 119 is connected to, of both end portions of the first feed pipe 111, the end portion on the downstream side, and is connected to, of both end portions of the second feed pipe 112, the end portion on the downstream side. According to the present preferred embodiment, the end portion of each of the first feed pipe 111 and the second feed pipe 112 on the downstream side can be at the same time supported and closed by the joining portion 119. The present preferred embodiment is able to achieve a reduced number of parts, a simplified structure, and increased ease in assembly when compared to the case where, for example, a joining member to join the first feed pipe and the second feed pipe to each other, a stopper member to close the end portion of the first feed pipe on the downstream side, and a stopper member to close the end portion of the second feed pipe on the downstream side are separately provided.

Referring to FIG. 11, the joining portion 119 is in the shape of a plate. The joining portion 119 is arranged to extend in the front-rear direction (i.e., the x-axis direction). The joining portion 119 includes fitting holes 119d. Each fitting hole 119d is, for example, in the shape of a circular hole, and in the present preferred embodiment, the joining portion 119 includes a pair of fitting holes 119d which are defined in opposite end portions of the joining portion 119 in the front-rear direction. A bolt (not shown) is inserted into each fitting hole 119d from the right side (i.e., the −y side). The bolt inserted into each fitting hole 119d is screwed into a female screw hole (not shown) defined in the top wall portion of the motor housing portion 6a, so that the coolant feed pipe unit 110 is fixed to the housing 6.

Within the coolant feed pipe unit 110, each of the first feed pipe 111, the second feed pipe 112, and the joining portion 119 is a portion of a single monolithic member. The first feed pipe 111, the second feed pipe 112, and the joining portion 119 are made of, for example, a resin. When compared to the case where the first feed pipe, the second feed pipe, and the joining portion are defined by separate members, for example, the present preferred embodiment is able to achieve a reduced number of parts, and eliminate the need for a process of fitting the first feed pipe 111, the second feed pipe 112, and the joining portion 119 together. In addition, sufficient accuracy in the relative positions of the first feed pipe 111 and the second feed pipe 112 can be stably ensured, making it easier to fit the coolant feed pipe unit 110 to the housing 6.

Although not illustrated in the figures, the first elastic ring member is an annular member capable of elastic deformation, and is, for example, an O ring or the like. The first elastic ring member is fitted to an outer circumferential surface of the decreased diameter portion 111b of the first feed pipe 111. That is, the first elastic ring member is fitted to an outer circumferential surface of, of both end portions of the first feed pipe 111, the end portion different from the end portion connected to the joining portion 119, i.e., of the end portion on the upstream side. According to the present preferred embodiment, the first elastic ring member is arranged between the end portion of the first feed pipe 111 on the upstream side and the hole portion (not shown) defined in the wall portion of the motor housing portion 6a or the partition 61c. Thus, sufficient sealing between the hole portion and the end portion of the first feed pipe 111 on the upstream side is ensured, allowing the coolant to be efficiently fed from the first feed pipe 111 to the outer circumferential surface of the stator 30. In addition, the first elastic ring member has a capability for vibration control, and contributes to preventing noise or the like from being caused by a vibration between the first feed pipe 111 and the hole portion.

Although not illustrated in the figures, the second elastic ring member is an annular member capable of elastic deformation, and is, for example, an O ring or the like. The second elastic ring member is fitted to an outer circumferential surface of the decreased diameter portion 112b of the second feed pipe 112. That is, the second elastic ring member is fitted to an outer circumferential surface of, of both end portions of the second feed pipe 112, the end portion different from the end portion connected to the joining portion 119, i.e., of the end portion on the upstream side. According to the present preferred embodiment, the second elastic ring member is arranged between the end portion of the second feed pipe 112 on the upstream side and the hole portion (not shown) defined in the wall portion of the motor housing portion 6a or the partition 61c. Thus, sufficient sealing between the hole portion and the end portion of the second feed pipe 112 on the upstream side is ensured, allowing the coolant to be efficiently fed from the second feed pipe 112 to the outer circumferential surface of the stator 30. In addition, the second elastic ring member has a capability for vibration control, and contributes to preventing noise or the like from being caused by a vibration between the second feed pipe 112 and the hole portion.

Referring to FIG. 10, the oil passage 90 includes a first oil passage 91 and a second oil passage 92. The second oil passage 92 includes a first flow passage 92a, a second flow passage 92b, a third flow passage 92c, the fourth flow passage 92d, and the intra-feed pipe flow passages 192d. A pump 96, a cooler 97, and the feed pipes (i.e., an oil feeding structure) 111 and 112 are arranged in a channel of the second oil passage 92. That is, the second oil passage 92, that is, the oil passage 90, includes flow passages arranged in the interior of the housing 6, and an oil feeding structure. The oil feeding structure includes the feed pipes 111 and 112 in which the oil O flows, and the feed pipes 111 and 112 include the injection holes 111c and 112c, respectively, each of which is arranged to open toward at least one of the stator core 32 and the coil ends 31a and 31b. In the present preferred embodiment, the feed pipes 111 and 112, which correspond to the oil feeding structure, define portions of the coolant feed pipe unit 110. The oil feeding structure is located on the upper side of the motor 2 to feed the oil O to at least one of the stator core 32 and the coil ends 31a and 31b.

The fourth flow passage 92d is defined in the partition 61c. The fourth flow passage 92d is joined to each of the first feed pipe 111 and the second feed pipe 112 of the coolant feed pipe unit 110. That is, the fourth flow passage 92d is arranged to join the third flow passage 92c to the coolant feed pipe unit 110. The partition 61c includes the fourth flow passage 92d as a portion of a flow passage arranged to feed the oil O to the feed pipes 111 and 112. The fourth flow passage 92d includes a first straight portion 92db and second connection hole portions (i.e., portions of the flow passage) 92dc. In the present preferred embodiment, the oil O is fed from the second connection hole portions 92dc, i.e., portions of the flow passage, which are arranged to extend along the axial direction, to the feed pipes 111 and 112, i.e., the oil feeding structure. Thus, advantageous effects similar to those of the first preferred embodiment can be achieved. In addition, because the oil O is fed through the injection holes 111c and 112c of the feed pipes 111 and 112, respectively, the oil O can be stably fed to at least one of the stator core 32 and the coil ends 31a and 31b even when the vehicle is traveling on a hill, for example.

In the present preferred embodiment, the plurality of feed pipes 111 and 112 are provided as the oil feeding structure. The plurality of feed pipes 111 and 112 include the first feed pipe 111 and the second feed pipe 112. Accordingly, the plurality of second connection hole portions 92dc are provided. The plurality of second connection hole portions 92dc include a pair of second connection hole portions 92dc arranged to branch out from the first straight portion 92db. Each of the second connection hole portions 92dc is connected to a separate one of the feed pipes 111 and 112. Also in the present preferred embodiment, the branching of the flow passage in an interior of the wall portion of the housing 6 eliminates the need to additionally provide a tube or the like for branching, which contributes to a reduced number of parts and a simplified structure. In addition, the oil O can be widely and efficiently fed to the stator 30 from the plurality of feed pipes 111 and 112.

The intra-feed pipe flow passages 192d are flow passages for the coolant arranged in an interior of the coolant feed pipe unit 110. That is, each intra-feed pipe flow passage 192d is located in the coolant feed pipe unit 110. The intra-feed pipe flow passage 192d is arranged to extend in the axial direction. The intra-feed pipe flow passage 192d is joined to the fourth flow passage 92d. Referring to FIG. 11, the plurality of intra-feed pipe flow passages 192d are provided in the coolant feed pipe unit 110, and in the present preferred embodiment, a pair of intra-feed pipe flow passages 192d are provided therein. Each of the pair of intra-feed pipe flow passages 192d is connected to the fourth flow passage 92d. Each of the pair of intra-feed pipe flow passages 192d is a flow passage located on the downstream side of the fourth flow passage 92d within the second oil passage 92. According to the present preferred embodiment, portions of the oil passage 90 can be defined by the coolant feed pipe unit 110, which leads to increased flexibility in the shape of the oil passage 90 and allows a simplified structure of the oil passage 90. One of the pair of intra-feed pipe flow passages 192d is located in the interior of the first feed pipe 111, and is joined to the first injection holes 111c arranged to open in the circumferential wall of the first feed pipe 111. The other one of the pair of intra-feed pipe flow passages 192d is located in the interior of the second feed pipe 112, and is joined to the second injection holes 112c arranged to open in the circumferential wall of the second feed pipe 112. That is, the intra-feed pipe flow passages 192d are joined to the injection holes 111c and 112c.

Note that the present invention is not limited to the above-described preferred embodiments, and that various modifications, etc., can be made without departing from the scope and spirit of the present invention, as described below, for example.

In the second preferred embodiment, each of the first feed pipe 111 and the second feed pipe 112 is a cylindrical pipe arranged to extend in a straight line along the axial direction, but this is not essential to the present invention. Each of the first feed pipe 111 and the second feed pipe 112 may not be a pipe but may alternatively be, for example, another duct or a block-like tube. At least one of the first feed pipe 111 and the second feed pipe 112 may not extend in a straight line, but may alternatively be arranged to extend, for example, in a curve.

The pump 96 is not limited to the electric pump, but may alternatively be, for example, a mechanical pump including a portion coupled to the shaft 21, and arranged to be capable of sending the oil O in accordance with rotation of the shaft 21 about the motor axis J2.

While preferred embodiments of the present invention and modifications thereof have been described above, it will be understood that features, a combination of the features, and so on according to each of the preferred embodiments and the modifications thereof are only illustrative and not restrictive, and that an addition, elimination, and substitution of a feature(s), and other modifications can be made without departing from the scope and spirit of the present invention. Also note that the present invention is not limited by the preferred embodiments and the modifications thereof.

What is claimed is:

1. A motor unit, comprising:
   a motor including
      a rotor configured to rotate about a motor axis extending in a horizontal direction, and
      a stator located radially outside of the rotor, the rotor including a shaft;
   a housing including a housing space to house the motor;
   an oil housed in the housing;
   an oil passage configured to circulate the oil in the housing space to cool the motor;
   a gear portion connected to the shaft of the rotor on one side in an axial direction of the motor axis; and
   a pump including a suction inlet which, when viewed along the axial direction, is located at a lower side of the motor axis; wherein
   the stator includes:
      a stator core; and
      at least one coil wound around the stator core;
   the at least one coil has a pair of coil ends arranged to project to opposite sides in the axial direction from the stator core;
   the housing includes:
      a motor housing portion wherein an interior of the motor housing portion defines a motor chamber to house the motor;
      a gear housing portion wherein an interior of the gear housing portion defines a gear chamber to house the gear portion; and
      a partition arranged to divide the gear chamber and the motor chamber;
   the oil passage includes:
      a flow passage arranged in an interior of the housing; and
      an oil feeding structure located on an upper side of the stator to feed the oil to the stator core and the pair of coil ends;
   the flow passage includes:
      a plurality of first intra-partition flow passages located in the partition and extending linearly and transversely to the motor axis; and
      a second intra-partition flow passage located in the partition, and extending in the axial direction from at least one of the plurality of first intra-partition flow passages; and
   each of the plurality of first intra-partition flow passages extends in different directions from each other;
   the plurality of first intra-partition flow passages includes
      a first straight portion which, when viewed along the axial direction, extends transversely to the motor axis and across the shaft at an upper side of the motor axis; and
      a third straight portion which, when viewed along the axial direction, extends transversely to the motor axis from the first straight portion toward a lower side of the oil feeding structure across the shaft;
   the third straight portion includes an upstream end which, when viewed along the axial direction, is located on the lower side of the motor axis;
   the second intra-partition flow passage includes one end at an upper side of the oil feeding structure, the one end having a second connection hole portion opened on the other side in the axial direction toward an inside of the motor chamber;
   the oil feeding structure extends in the axial direction; and
   the second connection hole portion is configured to allow the oil to pass therethrough to feed the oil to the oil feeding structure.

2. The motor unit according to claim 1, wherein
   the oil feeding structure includes a reservoir configured to store the oil; and
   the reservoir includes an outflow port arranged to open toward at least one of the stator core and the pair of coil ends.

3. The motor unit according to claim 1, wherein
   the oil feeding structure includes at least one feed pipe in which the oil flows; and
   the at least one feed pipe includes an injection hole arranged to open toward at least one of the stator core and the pair of coil ends.

4. The motor unit according to claim 3, wherein
   the at least one feed pipe includes a plurality of feed pipes; and
   the plurality of feed pipes include:
      a first feed pipe; and
      a second feed pipe arranged apart from the first feed pipe.

5. The motor unit according to claim 1, wherein
   the shaft of the rotor is arranged to extend along the axial direction with the motor axis as a center;
   the shaft includes:
      a hollow portion located inside of the shaft, and arranged to extend in the axial direction; and
      a communicating hole arranged to extend in a radial direction to bring the hollow portion into communication with a space outside of the shaft;
   the oil passage includes an intra-shaft channel located in the hollow portion; and
   the oil passage is arranged such that a direction in which the oil flows in the portion of the flow passage is same as a direction in which the oil flows in the intra-shaft channel.

* * * * *